US011922918B2

(12) United States Patent
Pignier Delafontaine et al.

(10) Patent No.: US 11,922,918 B2
(45) Date of Patent: Mar. 5, 2024

(54) NOISE CONTROLLING METHOD AND SYSTEM

(71) Applicant: Faurecia Creo AB, Linköping (SE)

(72) Inventors: Nicolas Jean Pignier Delafontaine, Norrviken (SE); Christophe Mattei, Linköping (SE); Robert Risberg, Linköping (SE)

(73) Assignee: Faurecia Creo AB, Linköping (SE)

( * ) Notice: Subject to any disclaimer, the term of this patent is extended or adjusted under 35 U.S.C. 154(b) by 74 days.

(21) Appl. No.: 17/626,014

(22) PCT Filed: Jul. 9, 2020

(86) PCT No.: PCT/EP2020/069333
§ 371 (c)(1),
(2) Date: Jan. 10, 2022

(87) PCT Pub. No.: WO2021/005142
PCT Pub. Date: Jan. 14, 2021

(65) Prior Publication Data

US 2022/0254328 A1 Aug. 11, 2022

(30) Foreign Application Priority Data

Jul. 11, 2019 (EP) .................................... 19185741

(51) Int. Cl.
*G10K 11/178* (2006.01)

(52) U.S. Cl.
CPC .. *G10K 11/17854* (2018.01); *G10K 11/17821* (2018.01); *G10K 11/17855* (2018.01);
(Continued)

(58) Field of Classification Search
CPC ....... G10K 11/17854; G10K 11/17855; G10K 11/17821; G10K 11/17881;
(Continued)

(56) References Cited

U.S. PATENT DOCUMENTS 5,329,587 A 7/1994 Morgan et al.
10,553,197 B1 2/2020 Christian et al.
(Continued)

FOREIGN PATENT DOCUMENTS

DE 102015120997 A1 6/2016
WO 2019005835 A1 1/2019
WO 2019024984 A1 2/2019

OTHER PUBLICATIONS

International Search Report and Written Opinion for International Application No. PCT/EP2020/069333, dated Oct. 6, 2020, (15 pages).

(Continued)

*Primary Examiner* — Vivian C Chin
*Assistant Examiner* — Douglas J Suthers
(74) *Attorney, Agent, or Firm* — Kagan Binder, PLLC

(57) ABSTRACT

A noise controlling method includes generating a reference signal representing a primary noise, generating a secondary noise in response to a control signal for cancelling the primary noise, generating an error signal representing a superposition of the primary and secondary noises at a position, generating an additional reference signal, secondary noise, or additional error signal, and generating the control signal for generating the secondary noise using adaptive subband filtering based on the reference and error signals, the generating the control signal including decomposing the reference signal and the error signal into a subband reference and error signal for each subband, updating subband adaptive filters for a subband based on the subband reference signal and the subband error signal, updating a fullband adaptive filter based on the updated subband adaptive filter, and generating the control signal by filtering the reference signal by the updated fullband adaptive filter.

15 Claims, 12 Drawing Sheets

(52) U.S. Cl.
CPC .. *G10K 11/17881* (2018.01); *G10K 11/17883* (2018.01); *G10K 2210/12821* (2013.01); *G10K 2210/3028* (2013.01); *G10K 2210/3053* (2013.01)

(58) Field of Classification Search
CPC ... G10K 11/17883; G10K 2210/12821; G10K 2210/3028; G10K 2210/3053
USPC ........................................................ 381/71.1
See application file for complete search history.

(56) References Cited

U.S. PATENT DOCUMENTS

| | | | | |
|---|---|---|---|---|
| 2014/0086425 | A1* | 3/2014 | Jensen ............ | G10K 11/17825 381/71.11 |
| 2016/0163304 | A1* | 6/2016 | Lee .................. | G10K 11/17833 381/71.4 |
| 2016/0163305 | A1* | 6/2016 | Lee .................. | G10K 11/17881 381/71.4 |
| 2017/0330551 | A1 | 11/2017 | Zafeiropoulos | |
| 2019/0130891 | A1 | 5/2019 | Zafeiropoulos | |
| 2019/0206382 | A1 | 7/2019 | Tani | |
| 2020/0313655 | A1* | 10/2020 | Bernstein ......... | G10K 11/17854 |

OTHER PUBLICATIONS

International Search Report and Written Opinion for International Application No. PCT/EP2020/069336, dated Nov. 18, 2020, (20 pages).

Extended European Search Report for European Application No. 19185741.6, dated Jan. 15, 2020, (7 pages).

Extended European Search Report for European Application No. 19185733.3, dated Feb. 21, 2020, (10 pages).

Cheer et al., “An Investigation of Delayless Subband Adaptive Filtering for Multi-Input Multi-Output Active Noise Control Applications,” IEEE/ACM Transactions on Audio, Speech, and Language Processing, vol. 25, No. 2, pp. 359-373, 2017, (15 pages).

Milani et al., “A New Delayless Subband Adaptive Filtering Algorithm for Active Noise Control Systems,” IEEE Transactions on Audio, Speech, and Language Processing, vol. 17, No. 5, pp. 1038-1045, 2009, (8 pages).

Spacenet Machine Translation of English Abstract for DE102015120997A1.

International Preliminary Report on Patentability for International Application No. PCT/EP2020/069333, dated Jan. 20, 2022, (8 pages).

* cited by examiner

NOISE CONTROLLING METHOD AND SYSTEM

CROSS-REFERENCE TO RELATED APPLICATIONS

This application claims priority to International Application No. PCT/EP2020/069333, filed Jul. 9, 2020 and titled "NOISE CONTROLLING METHOD AND SYSTEM," which in turn claims priority from a Swedish Patent Application having serial number 19185741.6, filed Jul. 11, 2019, both of which are incorporated herein by reference in their entireties.

TECHNICAL FIELD

The present document relates to a noise controlling method and system. In particular, it relates to a noise controlling method and system implemented by a subband adaptive active noise control, ANC, system for a vehicle.

BACKGROUND

Methods and systems for actively controlling noises, e.g., road noises, within an acoustic cavity, e.g., a vehicle, are widely studied. Such a method is often performed with the help of a feedforward control system, such as an ANC system and an Active Road Noise Control (ARNC) system.

The feedforward control systems typically involve i) one or several reference sensor(s) for detecting and/or measuring primary noises at noise sources; ii) one or several sound source(s), also known as secondary sound sources, e.g. loudspeakers of an existing audio system, for generating secondary noises to cancel the primary noises; iii) one or several error sensor(s) for detecting and/or measuring error signals representing a superposition of the primary noise and the secondary noise at different positions within an acoustic cavity, e.g., a vehicle cockpit; and iv) a control circuit, typically a digital signal processor (DSP) for performing an algorithm to generate control signals, such that the sound source(s) may be driven by the control signals to generate the secondary noises for cancelling the primary noises. The control signals are generated by filtering the reference signals generated by the reference sensor(s) with adaptive filters, which are updated by an adaptive algorithm, typically a least mean square (LMS) algorithm, to reduce a superposition of the primary and the secondary noises detected and/or measured by the error sensor(s), i.e. to reduce the error signal, or a squared pressure of a sound signal at the position of the error sensor(s).

Since it is known that a road noise is a broadband noise, many coefficients are needed for the adaptive filters to deal with such broadband noises. Consequently, a powerful control circuit is needed for effectively handling all the computation involved when executing the algorithm. Thus, the noise controlling method and system using such control circuit are generally expensive to implement.

Further, it is known that an amount of noise reduction within the acoustic cavity is limited by a multiple coherence between the reference signals and the sound field in the cavity. The multiple coherence is a measure of the degree of linearity between several inputs, i.e. the reference signals generated by the reference sensors, and an output, i.e. a sound signal at a position, such as a position close to a passenger's ear or head. It is a measure of how well the reference signals characterise the noise within the cavity. Thus, the ANC and/or ARNC systems usually need more than one reference signal to achieve a high coherence, and thus, to achieve a high noise reduction.

However, using as many as possible reference signals in the system has also disadvantages.

Firstly, it is expensive to implement as the complexity of both hardware and software for implementing the system increases, due to the increased number of the reference signals to be processed and the increased number of computational operations when executing the algorithm for updating the adaptive filters. Further, it is also expensive as the number of the hardware for implementing the system increases, due to, e.g., the increased number of physical inputs to the control circuit.

Secondly, the convergence speed may be degraded as the convergence speed of, e.g., a filtered least mean square, FXLMS, algorithm for a multiple inputs multiple outputs, MIMO, system, will be strongly affected by the eigenvalue spread of the autocorrelation matrix of the filtered inputs, i.e. the reference signals. That is, the larger the number of the reference signals in the system, the larger the size of the autocorrelation matrix, and consequently, a likelihood of a larger eigenvalue spread.

Therefore, on the one hand, an increased number of reference signals allows for a lower converged sound level in the car, which is desired. On the other hand, the increased number of reference signals not only increases the cost of the system, but also may cause a slower converge speed, which prevents a full convergence of the algorithm for a constantly changing noise environment, such as a road excitation.

Hence, there is a need to provide a noise controlling method and system, which can provide both a fast convergence speed for handling a changing noise environment, and being less expensive to implement.

SUMMARY

The invention is defined by the appended independent claims. Embodiments are set forth in the appended dependent claims, and in the following description and drawings.

According to a first aspect, there is provided a noise controlling method, comprising: generating one reference signal representing a primary noise; generating one secondary noise in response to a control signal, for cancelling the primary noise; generating one error signal representing a superposition of the primary noise and the secondary noise at a position. The method further comprises: generating at least one additional reference signal, and/or at least one additional secondary noise, and/or at least one additional error signal; and generating the control signal(s) for generating the secondary noise(s), by executing an adaptive subband filtering algorithm based on the reference signal(s) and the error signal(s); wherein the step of generating the control signal(s) comprises: decomposing the reference signal(s) and the error signal(s) into subband reference signal(s) and subband error signal(s), respectively, for each subband of a plurality of subbands; updating a subset of one or more subband adaptive filters for at least one subband of the plurality of subbands, based on a subset of the subband reference signal(s) of the at least one subband and a subset of the subband error signal(s) of the at least one subband, wherein at least one of said three subsets is a proper subset; updating at least one fullband adaptive filter based on the updated subband adaptive filter(s); generating the control signal(s) by filtering the reference signal(s) by the updated at least one fullband adaptive filter.

The step of generating at least one additional reference signal may refer to generating, e.g., by one or more reference sensors, one or more additional reference signals representing one or more different primary noises, respectively.

The step of generating at least one additional secondary noise may refer to generating, e.g., by one or more sound sources, one or more additional secondary noises in response to one or more different control signals, respectively.

The step of generating at least one additional error signal may refer to generating, e.g., by one or more error sensors, one or more additional error signals representing a superposition of the primary noise(s) and the secondary noise(s) at one or more different positions, respectively.

The inventive concept is to use only a part of the available resources for performing the adaptive subband active noise control. That is, for example, only some of rather than all of the plurality of subband reference signals may be used for updating the subband adaptive filter. Alternatively or in combination, only some of rather than all of the subband error signals may be used for updating the subband adaptive filter. Alternatively or in combination, only some of rather than all of the subband adaptive filters may be updated. Consequently, only some of the reference sensors of the system, and/or only some of the error sensors of the system, and/or only some of the sound sources of the system may be active for cancelling a certain noise.

By selecting the resources and/or the signals which contribute most to the noise control, and by using only the selected resources and/or signals to control the noise, a sufficient noise cancellation may be achieved, an amount of the algorithm computation may be reduced. Consequently, a faster convergence speed may be achieved for cancelling noises of a changing noise environment. The noise control method may also be implemented by a simpler and less costly processor.

An adaptive subband filtering algorithm is known to be implemented by the ANC or ARNC system for updating the subband adaptive filters on each subband. The adaptive subband filtering algorithm may be a delay-less subband FXLMS algorithm.

It may be advantageous as the subband adaptive filters may be updated based on a subset, preferably a proper subset, of the subband reference signals of the subband to which the subband adaptive filters belong, instead of based on all the subband reference signals of the subband. That is, a reduced number of subband reference signals are to be processed for the subband.

The subband adaptive filters may be updated based on a subset, preferably a proper subset, of the subband error signals of the subband to which the subband adaptive filters belong, instead of based on all the subband error signals of the subband. That is, a reduced number of subband error signals are to be processed for the subband.

Thus, it is possible to update only a subset, preferably a proper subset, of the subband adaptive filters of one subband, instead of updating all the subband adaptive filters of the subband. That is, a reduced number of subband adaptive filters are to be updated for the subband.

That is, for one subband, a subset of subband reference signals and a subset of subband error signals may be used to update a subset of subband adaptive filters, wherein at least one of said three subsets is a proper subset.

As for a subband, each subband adaptive filter may be associated to a respective secondary sound source for generating the secondary noise, this may be advantageous in determining which sound sources should be activated for the subband.

The generation of the control signal is not a part of the subband signal processings. The control signal may be generated by filtering the reference signal with the fullband adaptive filters reconstructed based on the updated subband adaptive filters.

By selecting only some of the available resources and/or available signals, the computational burden for controlling a broadband noise with the adaptive subband filtering algorithm may be reduced. Thus, cheaper control circuits may be used for implementing the noise controlling method in order to reduce the implementation cost.

This may be advantageous as the convergence speed may be improved.

The subset of the subband reference signals and/or the subset of the subband error signals, used for updating the subset of the subband adaptive filters, may be the subband signals, which are physically optimal in the sound field of an acoustic cavity. The term "physically optimal" may refer to, e.g., the subset of subband signals which are most physically relevant to the coupled modal excitations of the acoustic cavity structure. For example, the subband reference signal which correlates most, i.e. having a high coherence level, to an acoustic signal at a monitored position within the acoustic cavity is considered to be physically optimal in the sound field of the acoustic cavity. Those subband signals which are less physically relevant to the coupled modal excitations of the acoustic cavity structure may be ignored and not be processed for controlling the broadband noise, in order to reduce the computational burden and to improve the convergence speed.

The relationship of one set A being a "subset" of another set B is also called inclusion or sometimes containment. The set A is a subset of the set B means that all elements of the set A are also elements of the set B. Thus, the set A is a subset of the set B even when the set A equals to the set B, i.e. the sets A and B have exactly same elements. For example, if $B=\{1, 3, 5\}$ then $A=\{1, 3, 5\}$ is a subset of B.

A proper subset differs from the definition of subset. A proper subset C of the set B is a subset of the set B, which is not equal to the set B. In other words, if the set C is a proper subset of the set B, then all elements of the set C are elements of the set B. But the set B contains at least one element that is not an element of the set C. For example, if $B=\{1,3,5\}$, then $C=\{1\}$ is a proper subset of B. But $A=\{1, 3, 5\}$ is not a proper subset of B.

Wherein the noise controlling method may be an ANC method, or an ARNC method.

The term "decomposing" may refer to splitting a fullband signal into multiple subband signals. The multiple decomposed subband signals may be processed independently. The decomposition may be achieved via a filter bank comprising, e.g., a set of bandpass filters. The terms fullband and subband may be in terms of frequency bands, or frequency ranges. Thus, the fullband signal may be a signal of a large frequency range, and the subband signal may be a signal of a small frequency range, being an interval of the large frequency range.

An adaptive filter may be a system having a transfer function controlled by variable parameters and a means to adjust those parameters according to an optimization algorithm.

The term "fullband adaptive filter" may refer to an adaptive filter adjusting fullband signals according to an optimization algorithm. The fullband signals here may be the reference signal, the error signal and the control signal.

The term "subband adaptive filter" may refer to an adaptive filter adjusting subband signals according to an optimization algorithm. The subband signals here may be the subband reference signals and the subband error signals.

The method may be performed within a car, truck, train, airplane, and any other acoustic cavity.

At least one reference sensor may be provided for generating the reference signal representing the primary noise. The at least one reference sensor may be an accelerometer, a microphone, or a tachometer.

At least one sound source may be provided for generating the secondary noise in response to the control signal, for cancelling the primary noise. The at least one sound source may be a loudspeaker, or a vibrating panel. At least one error sensor may be provided for generating the error signal representing a superposition of the primary noise and the secondary noise at the position. The at least one error sensor may be a microphone.

The primary noise may be a road noise, a wind noise, or an engine noise.

The plurality of subbands may consist of a number K of subbands, K being an even positive integer. The method may further comprises performing the step of updating a subset of one or more subband adaptive filters for a number t of subbands of the plurality of subbands, wherein a relationship between the numbers K and t is: t=K/2+1.

Out of the k subbands, only the first subbands may be updated. The other $$\frac{K}{2}-1$$

subbands contain merely redundant information.

The adaptive subband filtering algorithm may comprise a filter bank comprising a plurality of subbands, for decomposing the reference signal(s) and the error signal(s).

The filter bank may be a Uniform Discrete Fourier Transform Modulated, UDFTM, filter bank.

The method may further comprise: prior to the step of decomposing the reference signal(s) and the error signal(s), filtering the reference signal(s) with a secondary path model $\hat{S}$.

The method may further comprise: after the step of decomposing the reference signal(s) and the error signal(s), for each subband of the plurality of subbands, filtering the subband reference signal(s) with a subband secondary path model.

The adaptive subband filtering algorithm may be a filtered-x least mean square, FXLMS, algorithm.

The FXLMS algorithm may be delay-less.

For the at least one subband of the plurality of subbands, the subset of subband adaptive filter(s) may be updated by using a least mean square, LMS, algorithm.

The fullband adaptive filter may be updated based on the updated subband adaptive filter(s), by a weight stacking scheme or a frequency stacking scheme.

The method may further comprise: for the at least one subband of the plurality of subbands, determining the subset of the subband reference signal(s) and/or the subset of the subband error signal(s) by an optimization process.

The subset of the subband reference signal(s) and/or the subset of the subband error signal(s) may be determined by the optimization process for, e.g., an optimal spatial matching of acoustic modes of the acoustic cavity for the subband.

When the method is applied in vehicles, the subset of the subband reference signal(s) and/or the subset of the subband error signal(s) may be determined based on an operating condition of the vehicle, such as a speed range, a type of road surface, and the like.

The different types of operating conditions may be stored in a table in a memory.

The optimization process may be a machine learning process.

Alternatively or in combination, the subset of the subband reference signal(s) and/or the subset of the subband error signal(s) may be determined based on physics of a system executing the method, such as an ANC system mounted within the vehicle.

The method may further comprise: determining a leakage factor of the adaptive subband filtering algorithm based on a statistical property of the reference signal(s) and/or of the error signal(s).

The introduction of a leakage factor in the LMS algorithm may be used for improving the algorithm performance regarding e.g., an ill-conditioned input signal, an algorithm stalling when the correction term is too small, an overflow due to finite-precision arithmetic, etc. In active noise control systems, introducing the leakage factor in the adaptive algorithm may attenuate the undesirable effects due to nonlinearities. The leakage factor is defined in, for example "Kuo, S. M., & Morgan, D. (1995). Active noise control systems: algorithms and DSP implementations. John Wiley & Sons, Inc".

The statistical property of the reference signal(s) and/or the error signal(s) may be a normalised property of the signal(s).

The method may further comprise: determining a step size of the adaptive subband filtering algorithm based on a statistical property of the reference signal(s) and/or of the error signal(s).

When the method comprising generating at least one additional reference signal, the method may further comprise for the at least one subband, selecting the subset of the subband reference signals, comprising steps in a following order:

1) calculating a coherence value representing a coherence level at a frequency range of the at least one subband, between each of the subband reference signals and an output signal, wherein the output signal is one of: the error signal(s) and a signal representing a sound measured at a second position;

2) among the subband reference signals, selecting a subband reference signal having a largest coherence value;

3) creating a remaining group of the subband reference signals, wherein the remaining group of the subband reference signals consists all the subband reference signals except the previously selected subband reference signal(s);

4) for each subband reference signal of the remaining group of subband reference signals, conditioning the subband reference signal for generating a corresponding conditioned subband reference signal;

5) for each conditioned subband reference signal, calculating a partial coherence value representing a coherence level at the frequency range of the at least one subband, between the conditioned subband reference signal and the output signal;

6) among the remaining group of reference signals, selecting a subband reference signal corresponding to a conditioned subband reference signal having a largest partial coherence value.

The output signal may be the error signal, e.g., measured by an error sensor.

The output signal may also be any signal measured in a position, e.g., where a sound needs to be reduced. The position may be around, e.g., an ear or head of a driver and/or passenger within a car. The output signal may be generated by a sensor, e.g., an existed error sensor, or a different sensor, such as a microphone, during a calibration.

The second position may be a position different from the position.

The method may further comprise repeating the steps 3)-6), until the remaining group of subband reference signals consisting of a last one subband reference signal, and selecting the last one subband reference signal.

The method may further comprise prior to selecting the last one subband reference signal, performing steps 4)-5) for conditioning the last one subband reference signal and calculating a partial coherence value between the conditioned last one subband reference signal and the output signal.

The method may further comprise repeating the steps 3)-6), until the largest partial coherence value calculated at the step 5) being smaller than a threshold.

The method may further comprise sorting the subband reference signals based on a sequence that each subband reference signal is selected, such that the subband reference signal selected at the step 2) has a highest ranking.

The selected subset of the subband reference signals comprises at least the subband reference signal selected at the step 2).

A relationship between the conditioned subband reference signals and the output signal may be $$Y=\Sigma_{i=1}^{n}L_{iy}X_{i.(i-1)!}+N$$

wherein Y may refer to the output signal, $X_{i.(i-1)!}$ may refer to a subband reference signal $X_i$ conditioned by the previously selected subband reference signal(s) $X_{i.(i-1)!}$, $L_{iy}$ may refer to a transfer function, and N may be a constant.

The step 4) of generating the conditioned subband reference signals $X_{i.(i-1)!}$ may comprise conditioning each subband reference signal of the remaining group of subband reference signals by a previously selected subband reference signal according to $$X_{i.(i-1)!}=X_{i.(i-2)!}-L_{(i-1)i}X_{(i-1)(i-2)!}.$$

The term "conditioning" may refer to manipulating or processing a signal in such a way that it meets requirements of a next stage for further processing.

By removing the redundancies between the subband reference signals, the subband reference signals may be arranged in an arbitrary order. That is, the order of the subband reference signals may not play any role in determining their contributions to the output signal.

The method may further comprise prior to the step 1) of calculating the coherence value, arranging the subband reference signals in an arbitrary order.

The method may further comprise prior to the step 1) of calculating the coherence value, performing an optimal least-square identification on the subband reference signals and the output single.

According to a second aspect, there is provided a noise controlling system, comprising: one reference sensor configured to generate one reference signal representing a primary noise; one sound source configured to generate one secondary noise in response to a control signal, for cancelling the primary noise; one error sensor configured to generate one error signal representing a superposition of the primary noise and the secondary noise at a position. The system further comprises: an additional reference sensor configured to generate an additional reference signal; and/or an additional sound source configured to generate an additional secondary noise; and/or an additional error sensor configured to generate an additional error signal; and a control circuit configured to generate the control signal(s) for generating the secondary noise(s), by executing an adaptive subband filtering algorithm based on the reference signal(s) and the error signal(s); wherein the control circuit is further configured to: decompose the reference signal(s) and the error signal(s) into subband reference signal(s) and subband error signal(s), respectively, for each subband of a plurality of subbands; update a subset of one or more subband adaptive filters for at least one subband of the plurality of subbands, based on a subset of the subband reference signal(s) of the at least one subband and a subset of the subband error signal(s) of the at least one subband, wherein at least one of said three subsets is a proper subset; update at least one fullband adaptive filter based on the updated subband adaptive filter(s); generate the control signal(s) by filtering the reference signal(s) by the updated at least one fullband adaptive filter.

The plurality of subbands may consist of a number K of subbands, K being an even positive integer. The control circuit may be further configured to update a subset of one or more subband adaptive filters for a number t of subbands of the plurality of subbands, wherein a relationship between the numbers K and t is: t=K/2+1.

DESCRIPTION OF EMBODIMENTS

Figure 1:
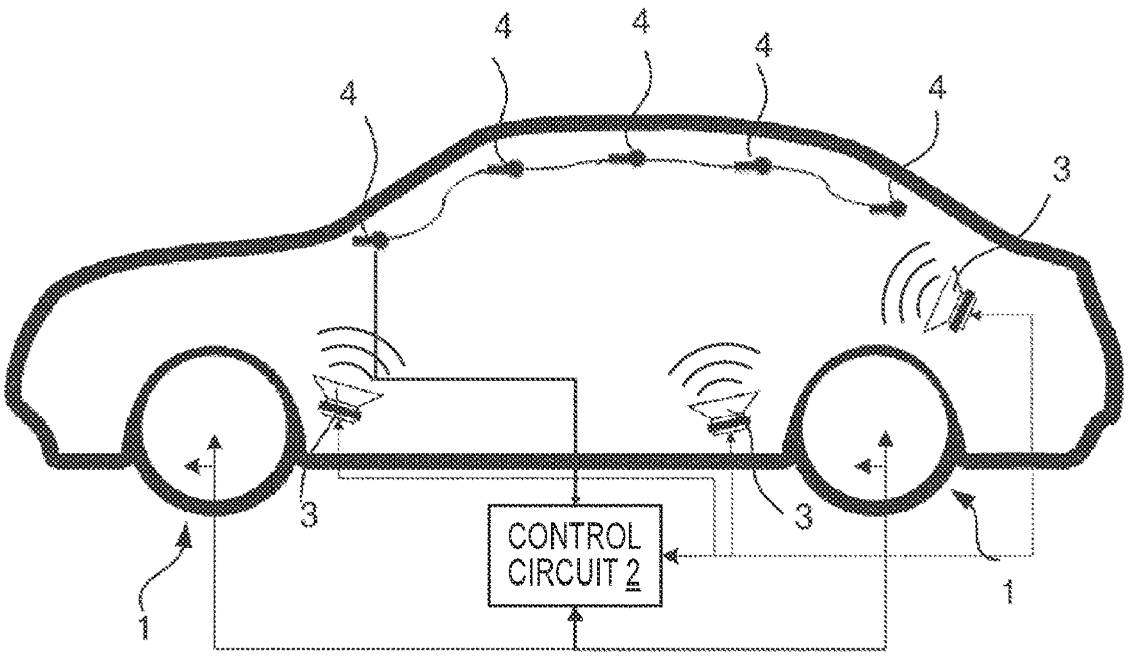
FIG. 1 illustrates a schematic view of a car having an ANC or ARNC system.
Figure 2:
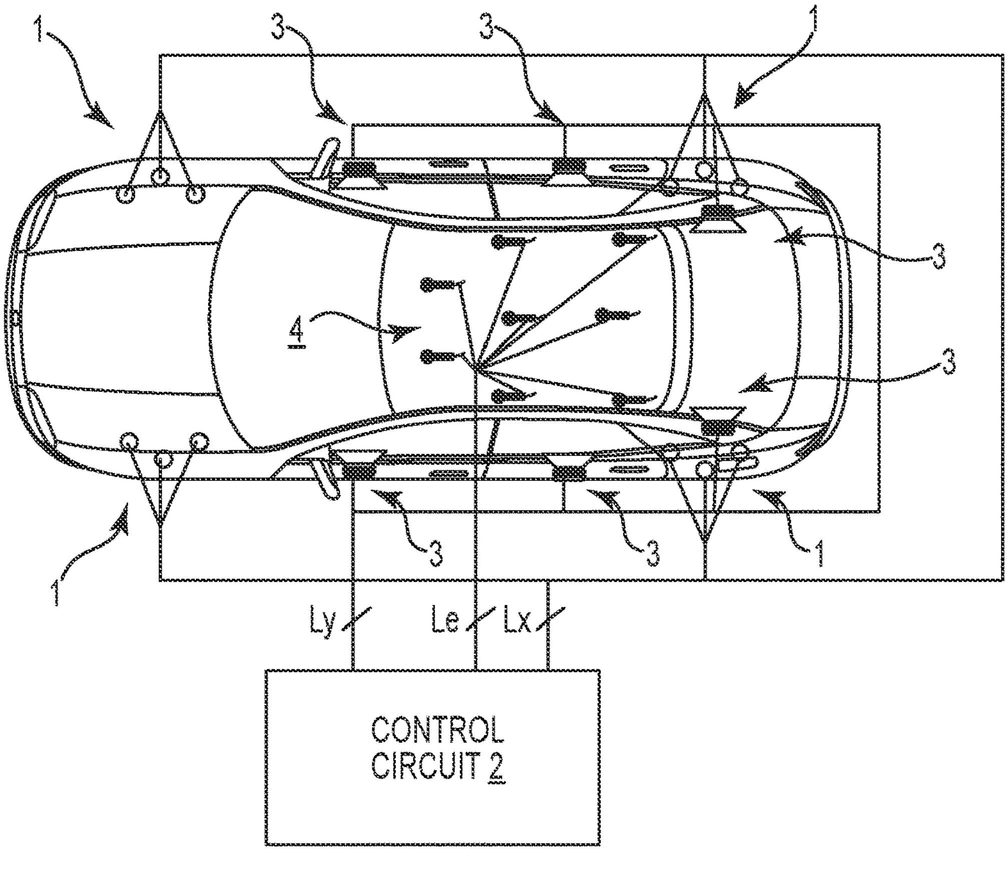
FIG. 2 illustrates a top view of a car having an ANC or ARNC system.

FIGS. 1-2 illustrate a schematic view and a top view of a car having an ANC or ARNC system, respectively. The numbers of the reference sensors, the sound sources, and the error sensors shown in the figures are only illustrative examples.

In FIGS. 1-2, the system comprises $L_x$ reference sensors 1, $L_y$ sound sources 3, $L_e$ error sensors 4 and a control circuit 2.

The sound sources 3 may be actuators, such as loudspeakers or vibrating surfaces, e.g., active panels.

The error sensors 4 may be, e.g., microphones, placed within an acoustic cavity, such as a car cockpit as shown in FIGS. 1-2. The error sensors 4 may be placed closed to a driver's or passenger's ear or head.

The reference sensors 1 may be, e.g., accelerometers, placed closed to a noise source. For example, they may be place on a car chassis around the wheels of the car, as shown in FIG. 1. Alternatively, the reference sensors 1 may be placed within the car cockpit. The reference sensors 1 may be any other type of sensors for characterising an excitation of an acoustic field or an excitation of a structure.

The reference sensors 1, the error sensors 4 and sound sources 3 may be respectively connected in parallel to the control unit 2, as shown in FIGS. 1-2. The reference sensors 1, the error sensors 4, the sound sources 3 and the control circuit 2 may be connected via a wire or wirelessly.

The control circuit 2 is shown as an entity outside the car in FIGS. 1-2. However, the control unit may be within the car, e.g., as a part of a vehicle system.

Figure 3:
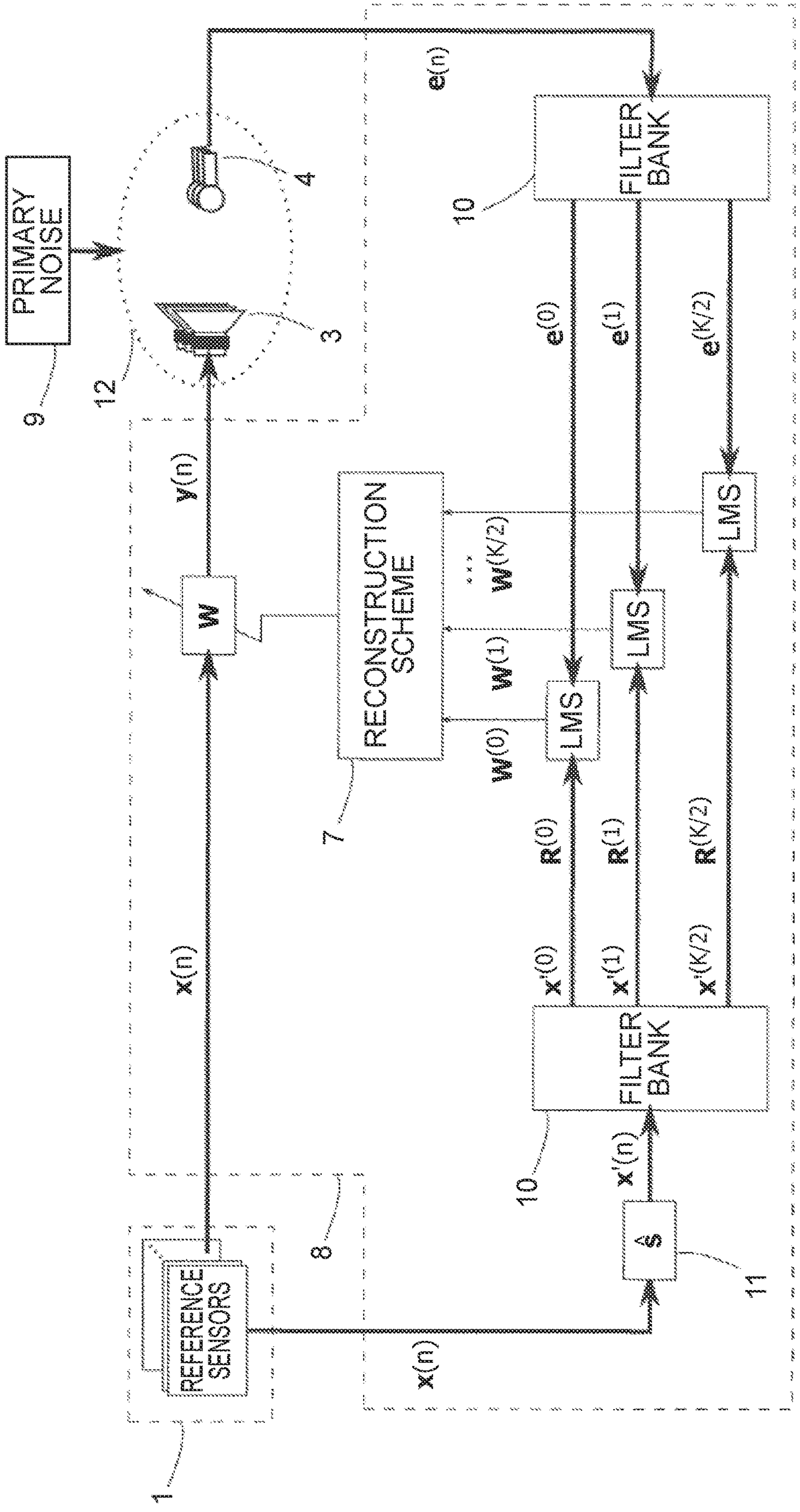
FIG. 3 illustrates an example of a delay-less subband FXLMS algorithm implemented in an ANC or ARNC system.

FIG. 3 illustrates an example of a known delay-less subband FXLMS algorithm implemented in an ANC or ARNC system.

The method shown in FIG. 3 can be found in, for example, [1] Cheer, J., & Daley, S. (2017), *An investigation of delayless subband adaptive filtering for multi-input multi-output active noise control applications. IEEE/ACM Transactions on Audio, Speech, and Language Processing,* 25(2), 359-373; and [2] Milani, A. A., Panahi, I. M., & Loizou, P. C. (2009), A new delayless subband adaptive filtering algorithm for active noise control systems. IEEE transactions on audio, speech, and language processing, 17(5), 1038-1045.

In FIG. 3, the system comprises $L_x$ reference sensors 1, $L_y$ sound sources 3, $L_e$ error sensors 4 and an adaptive subband filtering algorithm 8 executed by a control circuit (not shown). The $L_x$ reference sensors 1 generate $L_x$ reference signals x(n), respectively, which may be represented in a vector notation by $x(n)=(x_1(n), \ldots, x_{L_x}(n))$. The $L_e$ error sensors 4 generate $L_e$ error signals e(n), respectively, which may be represented in a vector notation by $e(n)=(e_1(n), \ldots, e_{L_e}(n))$. The $L_y$ sound sources 3 are driven by $L_y$ control signals y(n), respectively, which may be represented in a vector notation by $y(n)=(y_1(n), \ldots, y_{L_y}(n))$.

The adaptive subband filtering algorithm 8 is used to generate the control signals y(n) by filtering the reference signals x(n) with adaptive filters W(n), such that the sound sources 3 may generate the secondary noises to cancel primary noise 9. The sound sources 3 and the error sensors 4 are provided in an acoustic propagation domain 12. The acoustic propagation domain 12 may be either open or closed.

The primary noise 9 may be a road noise, generated by e.g., an interaction of a vehicle with a road through wheels. The primary noise 9 may also be any other type of noises, such as a wind noise or an engine noise, provided that the noise may be characterised by physically measurable reference signals.

The adaptive filters W(n) may be updated according to any known method, such as a LMS algorithm, to reduce a superposition of the primary noise 9 and the secondary noise at the error sensors 4, i.e. to reduce the error signals e(n), or a squared pressure at the error sensors 4. The adaptive filters W(n) may be updated continuously. The adaptive subband filtering algorithm 8 in FIG. 3 may be a delay-less subband FXLMS algorithm. The term delay-less refers to the fact that the control signals are generated from the reference signals in the time-domain using the fullband adaptive filters W(n) for each sample, meaning that there is no additional delay in the generation of the control signals compared to the fullband FXLMS algorithm.

The reference signals $x(n)=(x_1(n), \ldots, x_{L_x}(n))$ may be first filtered by a secondary path model $\hat{S}$ 11, which represents a plurality of acoustic transmission paths from each of the plurality of sound sources, also known as secondary sound sources, to each of the plurality of error sensors. Thus, the number of secondary paths may be the number of the sound sources multiplied by the number of the error sensors, i.e. $L_y$*$L_e$ in this example.

The filtered reference signals x' (n) may be represented in a vector notation by $x'(n)=(x_{1,1,1}(n), \ldots x_{L_e,1,1}(n), \ldots, x_{L_e,L_x,1}(n), \ldots, x_{L_e,L_x,L_y}(n))$. The filtered reference signals x'(n) may be filtered by a filter bank 10. As a consequence, K subband signals may be generated from each of the filtered reference signals. The filter band 10 may comprise a decimation step of a factorD, wherein $$D=\frac{K}{4}.$$

This may result in $L_x$ subband reference signals $x'^{(k)}$ per subband. Further, since the reference signals x(n) are filtered by the secondary paths model $\hat{S}$ 11, which comprises $L_y$*$L_e$ secondary paths, each subband reference signal $x'^{(k)}$ contains $L_y$*$L_e$ signals. This may result in a total $L_x$*$L_y$*$L_e$ subband reference signals $x'^{(k)}$ per subband.

A subband reference matrix $R^{(k)}$ may be a matrix, wherein each coefficient is made of the subband filtered reference signals. The subband reference matrix $R^{(k)}$ for the subband k may be expressed as $$R^{(k)}=\begin{bmatrix} r_1^T(n) & \ldots & r_1^T(n-ISAF+1) \\ \vdots & \ddots & \vdots \\ r_{L_e}^T(n) & \ldots & r_{L_e}^T(n-ISAF+1) \end{bmatrix},$$

wherein $$r_{l_e}^T(n-i+1)=\left[x'_{l_e11}(n-i+1) \ldots x'_{l_e1L_x}(n-i+1) \ldots \ldots x'_{l_eL_yL_x}(n-i+1)\right],$$

$$i=1 \ldots ISAF.$$

ISAF may represent a length of the subband adaptive filters of the subband k. n may refer to a time step n. For example, when n refers to a current time step, n−1 refers to a previous time step and n+1 refers to a next time step.

The error signals e(n) are also decimated by the filter bank 10, as the reference signals x(n). This results in $L_e$ subband error signals $e^{(k)}$ per subband.

Preferably, out of the K subbands created by the filter bank 10, only the first $$\frac{K}{2}+1$$

subbands are used. The others subbands may contain merely redundant information.

For each subband k of the first $$\frac{K}{2}+1$$

subbands, the subband adaptive filters $W^{(k)}$ are updated by an adaptive algorithm, such as an LMS algorithm as shown in FIG. 3, based on the subband reference signals, the subband error signals. The control signals y(n) are generated from the fullband reference signals x(n), using the fullband adaptive filters.

When the subband adaptive filter(s) $W^{(k)}$ of each subband k, preferably each subband of the first $$\frac{K}{2}+1$$

subbands are updated, the fullband adaptive filters may be reconstructed, based on the updated subband adaptive filters by a well-known scheme 7, e.g., a weight or frequency stacking scheme.

The filter bank 10 may be an analysis filter bank, such as a Uniform Discrete Fourier Transform Modulated, UDFTM, filter bank. The weight stacking scheme may be a proposed Fast Fourier Transform weight stacking scheme described in [2].

Figure 4:
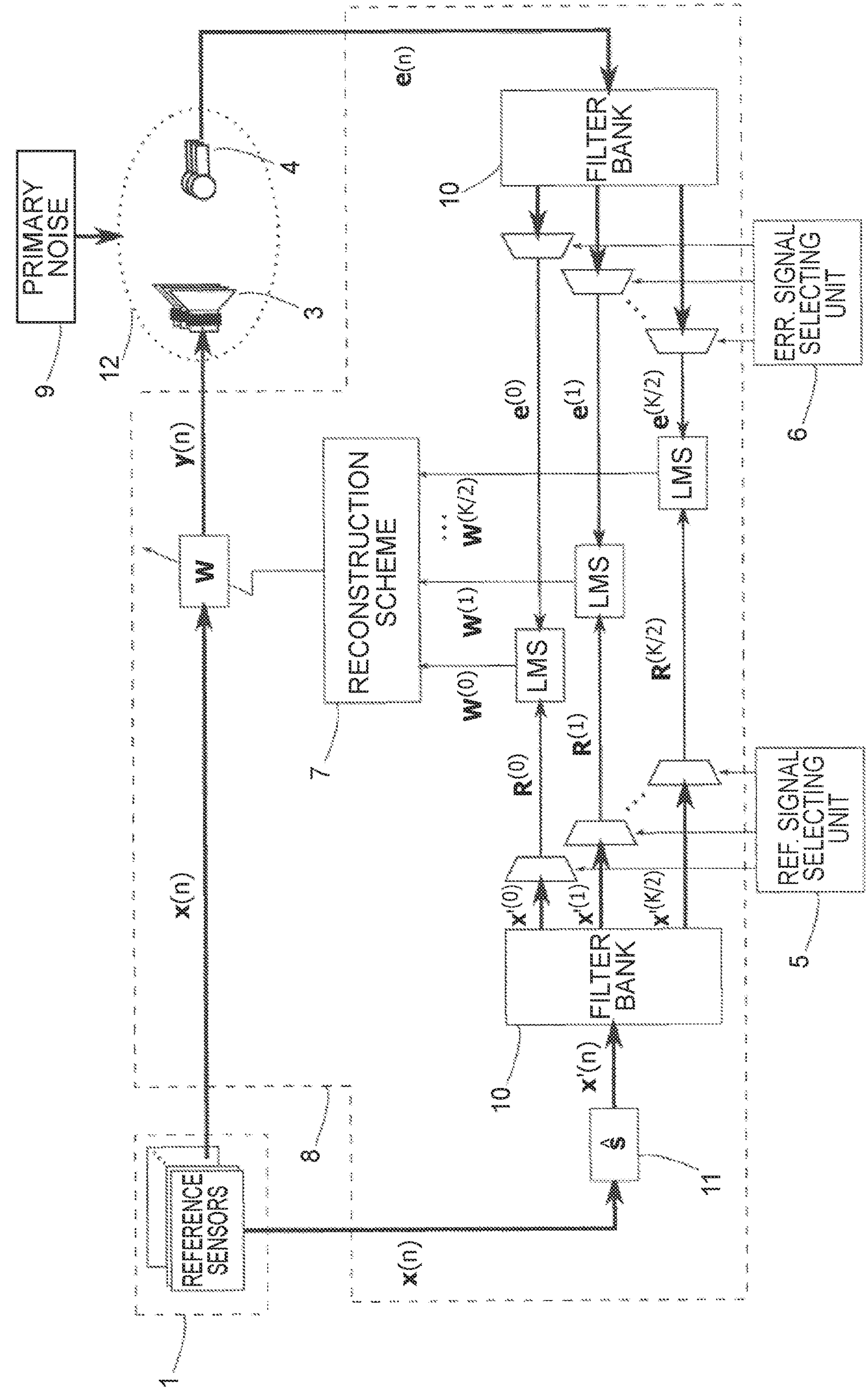
FIG. 4 illustrates an example of a noise controlling system.

In connection with FIG. 4, the noise controlling system according to the invention is discussed in detail.

In FIG. 4, for each subband k, preferably of the first $$\frac{K}{2}+1$$

subbands, a proper subset of the filtered subband reference signals of the subband k may be selected, e.g., by a reference signal selecting unit 5 of the control circuit (not shown). For each subband k, a proper subset of the subband error signals of the subband k may be selected, e.g., by an error signal selecting unit 6 of the control circuit.

For each subband k, each subband adaptive filter may correspond to a secondary sound source for generating the secondary noise. For each subband k, a proper subset of the subband adaptive filters kmay be selected, e.g., by an adaptive filter selecting function of the control circuit (not shown).

The reference signal selecting unit 5, the error signal selecting unit 6 and the adaptive filter selecting function may be combined as one or two selecting unit(s), or provided as three separate selecting units. For example, the reference signal selecting unit 5 and the adaptive filter selecting function may be provided as one selecting unit 5.

For each subband k, only the selected subset of the subband reference signals, and/or the selected subset of the subband error signals are used for updating the selected subset of subband adaptive filters $W^{(k)}$ wherein at least one of these three selected subsets is a proper subset, The superscript$^{(k)}$ may represent a quantity related to the subband k.

The reference signal selecting unit 5 may comprise a function $\chi^{(k)}$ for selecting a subset, preferably a proper subset, of the $L_x$ reference sensors 1 for the subband k. The function $\chi^{(k)}$ may be a function defining which of the $L_x$ reference sensors are to be selected, and/or activated, for the subband k. The function $\chi^{(k)}$ may be predetermined. For the subband k, only the subband reference signals decomposed from the reference signals generated by the selected reference sensors are to be used.

$L_x^{(k)}$ may be the number of the reference sensors selected for the subband k. $L_x^{(k)}$ may be smaller than $L_x$. That is, $L_x^{(k)} \leq L_x$.

The reference signal selecting unit 5 and/or the error signal selecting unit 6 may comprise a function $\epsilon^{(k)}$ for selecting a subset, preferably a proper subset, of the error sensors 4 for the subband k. The function $\epsilon^{(k)}$ may be a function defining which of the $L_e$ error sensors are to be selected, and/or activated, for the subband k. The function $\epsilon^{(k)}$ may be predetermined. For the subband only the subband error signals decomposed from the error signals generated by the selected error sensors are to be used.

$L_e^{(k)}$ may be the number of the error sensors selected for the subband k. $L_e^{(k)}$ may be smaller than $L_e$. That is, $L_e^{(k)} \leq L_e$.

The adaptive filter selecting function may be a function $\psi^{(k)}$ for selecting a subset, preferably a proper subset, of the sound sources 3 for the subband k. The function $\psi^{(k)}$ may be a function defining which of the $L_y$ sound sources 3 are to be selected, and/or activated, for the subband k. The function $\psi^{(k)}$ may be predetermined. For the subband only the subband adaptive filters corresponding to these selected sound sources may be updated.

$L_y^{(k)}$ may be the number of the sound sources selected for the subband k. $L_y^{(k)}$ may be smaller than $L_y$. That is, $L_y^{(k)} \leq L_y$.

The selected subset of subband reference signals and the selected subset of subband error signals used to update the selected subset of subband adaptive filters, e.g., defined respectively by the functions $\epsilon^{(k)}, \psi^{(k)}$ and $\chi^{(k)}$, may be selected based on the physics properties of each subband, e.g., the different frequency ranges. For example, for a subband corresponding to a low frequency range, a subband reference signal decomposed from a reference signal generated by a reference sensor for detecting a high frequency noise may not be selected for updating the subband adaptive filters of this subband This may allow a reduced computational cost, in addition to a potential gain in performance.

The functions and may be used in the reference signal selecting unit 5 and/or the error signal selecting unit 6 to select a subset of the subband reference and error signals. For example, the reference signal selecting unit 5 may use all three functions and to select a subset of subband reference signals. In the example of FIG. 4, since there is one secondary path model for each couple of a sound source and an error sensor, the subband filtered reference signals may be indexed by [reference sensor, sound source, error sensor] so all three functions may be used to select one of these indexes, in order to determine which of the subband reference signals are to be selected.

Figure 5:
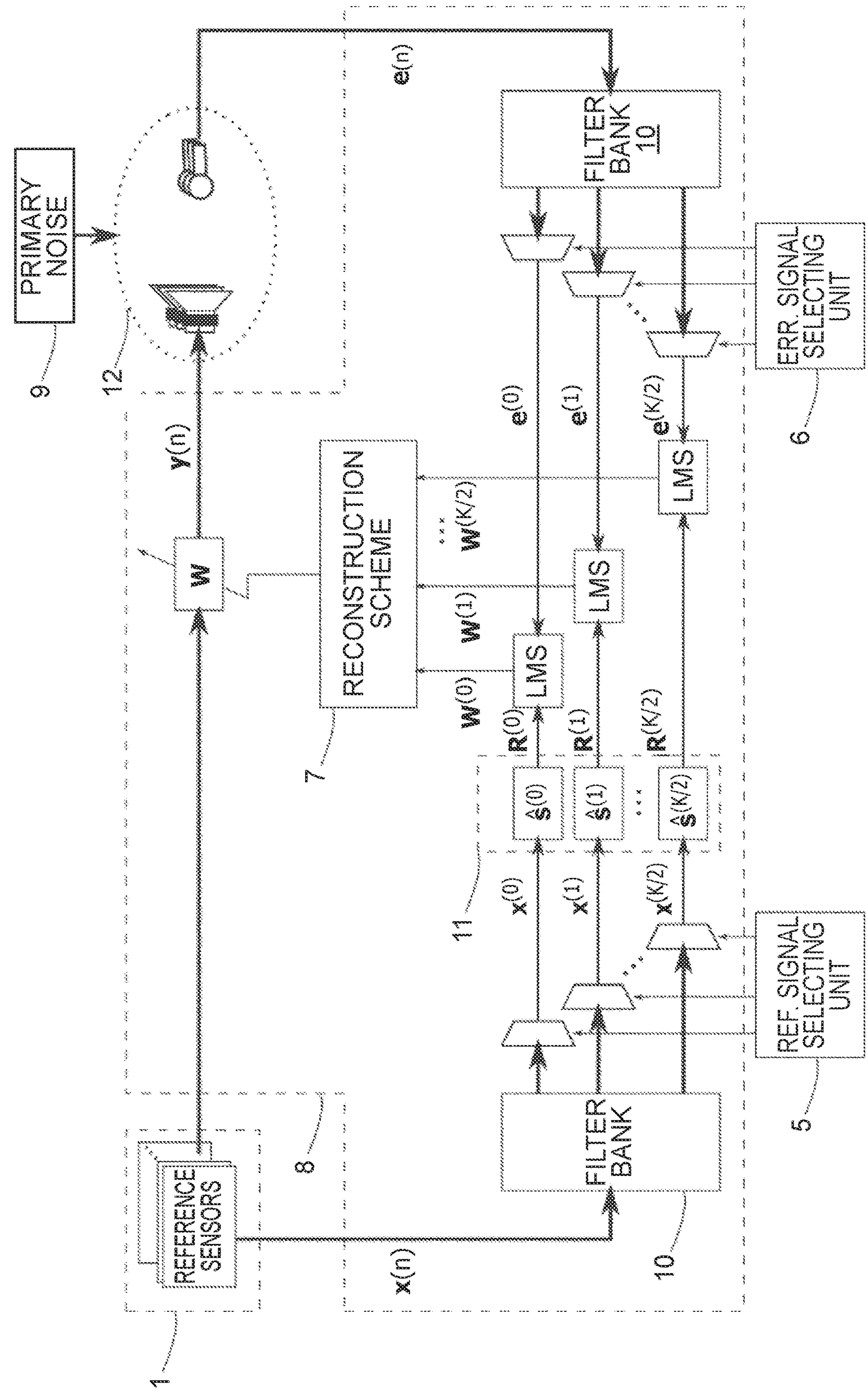
FIG. 5 illustrates an example of a noise controlling system.

When the reference signals are decomposed to subband reference signals, and the subband reference signals are selected prior to a subband secondary path filtering, as the example of FIG. 5, the reference signal selecting unit 5 may use only the function for selecting the subband reference signals. The error signal selecting unit 6 may only use the function for selecting the subband error signals.

The selected subset of the subband error signals $e^{(k)}$ for the subband k may be expressed as $$e^{(k)}(n) = \begin{bmatrix} e_{\epsilon^{(k)}(1)} \\ \vdots \\ e_{\epsilon^{(k)}\left(L_e^{(k)}\right)} \end{bmatrix}.$$

The subband reference matrix $R^{(k)}$ for the subband k may be expressed as $$R^{(k)} = \begin{bmatrix} r^T_{\epsilon^{(k)}(1)}(n) & \dots & r^T_{\epsilon^{(k)}(1)}(n - ISAF + 1) \\ \vdots & \ddots & \vdots \\ r^T_{\epsilon^{(k)}\left(L_e^{(k)}\right)}(n) & \dots & r^T_{\epsilon^{(k)}\left(L_e^{(k)}\right)}(n - ISAF + 1) \end{bmatrix},$$

wherein wherein $\mu^{(k)}$ is a step size, also called as a convergence gain or a learning rate.

When a proper subset of the subband reference signals are selected and used for updating the subband adaptive filters for a subband, as in FIG. 4, the subband reference matrix $R^{(k)}$ may have a reduced size comparing to the example of FIG. 3.

Alternatively or in combination, when a proper subset of the subband error signals are selected and used for updating the subband adaptive filters for a subband, as in FIG. 4, the subband reference matrix $R^{(k)}$ may have a reduced size comparing to the example of FIG. 3.

Alternatively or in combination, when a proper subset of the subband adaptive filters are updated on a subband, the subband reference matrix $R^{(k)}$ may have a reduced size comparing to the example of FIG. 3.

Consequently, the above formulations related to the subband reference matrix $R^{(k)}$ also differ from that of the example of FIG. 3.

$$r^T_{\epsilon^{(k)}(l_e)}(n-i+1) = \left[ x'_{\epsilon^{(k)}(l_e)\psi^{(k)}(1)\chi^{(k)}(1)}(n-i+1) \ \dots \ x'_{\epsilon^{(k)}(l_e)\psi^{(k)}(1)\chi^{(k)}\left(L_x^{(k)}\right)}(n-i+1) \ \dots \ \dots \ x'_{\epsilon^{(k)}(l_e)\psi^{(k)}\left(L_y^{(k)}\right)\chi^{(k)}\left(L_x^{(k)}\right)}(n-i+1) \right],$$

$$i = 1 \dots ISAF.$$

ISAF may represent a length of the subband adaptive filters of the subband k.

Each x' may represent a selected subband filtered reference signal, corresponding to the selected reference sensors $\chi^{(k)}(l_x)$, the selected error sensors $\epsilon^{(k)}(l_e)$ and the selected sound sources $\psi^{(k)}(l_y)$.

$$x'_{\epsilon^{(k)}(l_e)\psi^{(k)}(l_y)\chi^{(k)}(l_x)}(n-i+1) = \hat{g}^T_{\epsilon^{(k)}(l_e)\psi^{(k)}(l_y)} x_{\chi^{(k)}(l_x)}(n-i+1)$$

$$\hat{g}^T_{\epsilon^{(k)}(l_e)\psi^{(k)}(l_y)} = \left[ \hat{g}_{\epsilon^{(k)}(l_e)\psi^{(k)}(l_y)}(1) \ \dots \ \hat{g}_{\epsilon^{(k)}(l_e)\psi^{(k)}(l_y)}(J) \right]$$

wherein J is a length of the filters for the secondary path model.

The secondary path models are finite impulse responses between the sound sources, i.e. the secondary sound sources, and the error sensors, mathematically represented by J coefficients.

For each subband k, the subband adaptive filters $W^{(k)}$ may be expressed as $$W^{(k)} = \begin{bmatrix} w_1^{(k)} \\ \vdots \\ w_{ISAF}^{(k)} \end{bmatrix}.$$

Each subband adaptive filter $w_i^{(k)}$ of the subband adaptive filters $W^{(k)}$ may be expressed as Further, according to the example of FIG. 4, only a selected subset of the subband adaptive filters may be updated for a subband.

Once the selected subband adaptive filters $W^{(k)}$ are updated, the fullband adaptive filters W may be reconstructed by a known weight or frequency stacking scheme 7, as shown in FIG. 4. Since only some of the subband adaptive filters may be updated on at least one subband, the reconstruction scheme 7 is performed by only using the updated subband adaptive filters. There is no need to use the non-updated subband adaptive filters for reconstructing the fullband adaptive filters, because their coefficients are useless, e.g. being zeros.

FIG. 5 is another example of a noise controlling system. The example of FIG. 5 differs from the examples of FIGS. 3-4 in that the reference signals x(n) in FIG. 5 are not filtered by the secondary path model $\hat{S}$ 11 before filtering by the filter bank 10. Rather, the reference signals x(n) in FIG. 5 are filtered and decimated by the filter bank 10 first. This results in $L_x$ subband reference signals $x^{(k)}$ for each subband k.

For each subband k, a subset of the subband reference signals may be selected, e.g., by the reference signal selecting unit 5 of a control circuit (not shown). For each subband k, the selected subset of the subband reference signals may be filtered by a subband secondary path model $\hat{S}^{(k)}$ before updating the subband adaptive filters $W^{(k)}$.

That is, in the examples of FIGS. 3-4, all the reference signals x(n) are filtered by the secondary path model $\hat{S}$. However, in the example of FIG. 5, for each subband k, only $$w_i^{(k)} = \left[ w^{(k)}_{\psi^{(k)}(1)\chi^{(k)}(1)i} \ \dots \ w^{(k)}_{\psi^{(k)}(1)\chi^{(k)}\left(L_x^{(k)}\right)i} \ w^{(k)}_{\psi^{(k)}(2)\chi^{(k)}(1)i} \ \dots \ w^{(k)}_{\psi^{(k)}(2)\chi^{(k)}\left(L_x^{(k)}\right)i} \ \dots \ \dots \ w^{(k)}_{\psi^{(k)}\left(L_y^{(k)}\right)\chi^{(k)}\left(L_x^{(k)}\right)i} \right]^T. \quad (1)$$

The subband adaptive filters $W^{(k)}$ at a time step n+1 may be updated using a known method, such as an LMS algorithm as shown in FIG. 4, according to $$W^{(k)}(n+1) = W^{(k)}(n) - \mu^{(k)} R^{(k)H}(n) e^{(k)}(n),$$

the selected subband reference signals are filtered by the subband secondary path model $\hat{S}^{(k)}$. The subband secondary path model are subband equivalent of the secondary path model $\hat{S}$ 11 of FIG. 4. For example, the subband secondary path model $\hat{S}^{(k)}$ may be obtained by filtering the secondary path model $\hat{S}$ 11 of FIG. 4 by the filter bank 10.

This may be advantageous as by filtering only a selected subset of subband reference signals, the computational cost may be further reduced.

Each of the subband secondary path model $\hat{S}^{(k)}$ may be modelled with $J_{SAF}$ coefficients. Due to the decimation factor applied during subband filtering by the filter bank 10, $J_{SAF}$ may be smaller than J. For example, $J_{SAF}$ may be taken as a value related to J and K, such as $J_{SAF}=4J/K$.

Further, a memory with a smaller size can be used for storing the subband secondary path model $\hat{S}^{(k)}$, comparing to a memory for storing the secondary path model $\hat{S}$ in FIGS. 3-4.

Figure 6A:
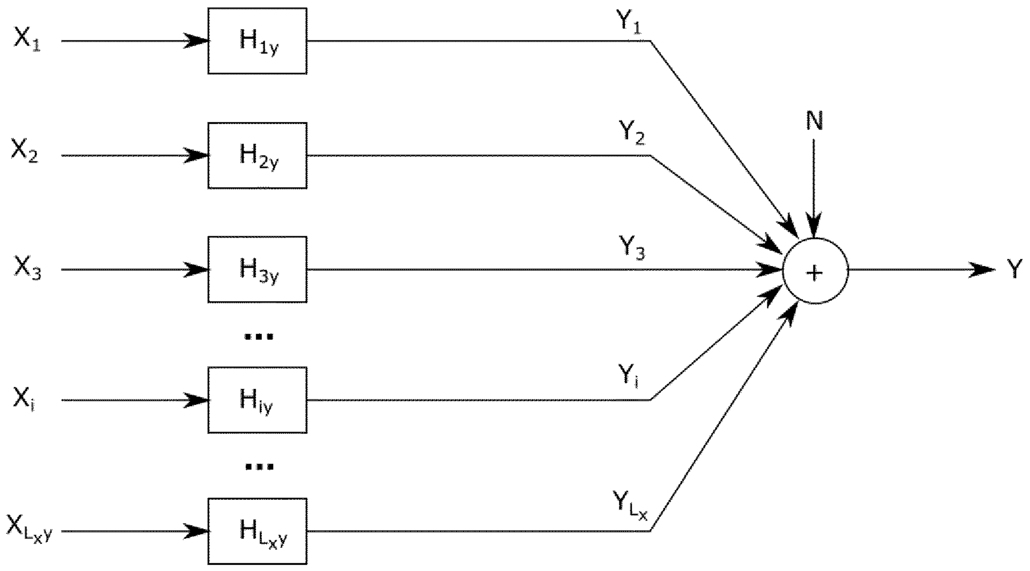
FIG. 6*a* illustrates an example of a MISO system.
Figure 6B:
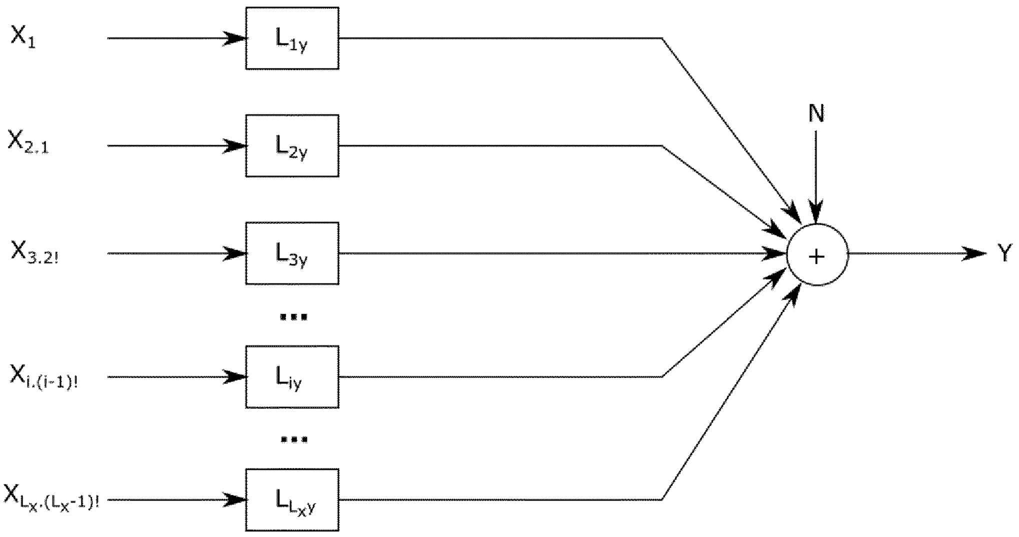
FIG. 6*b* illustrates an equivalent of the MISO system of FIG. 6*a*.
Figure 7:
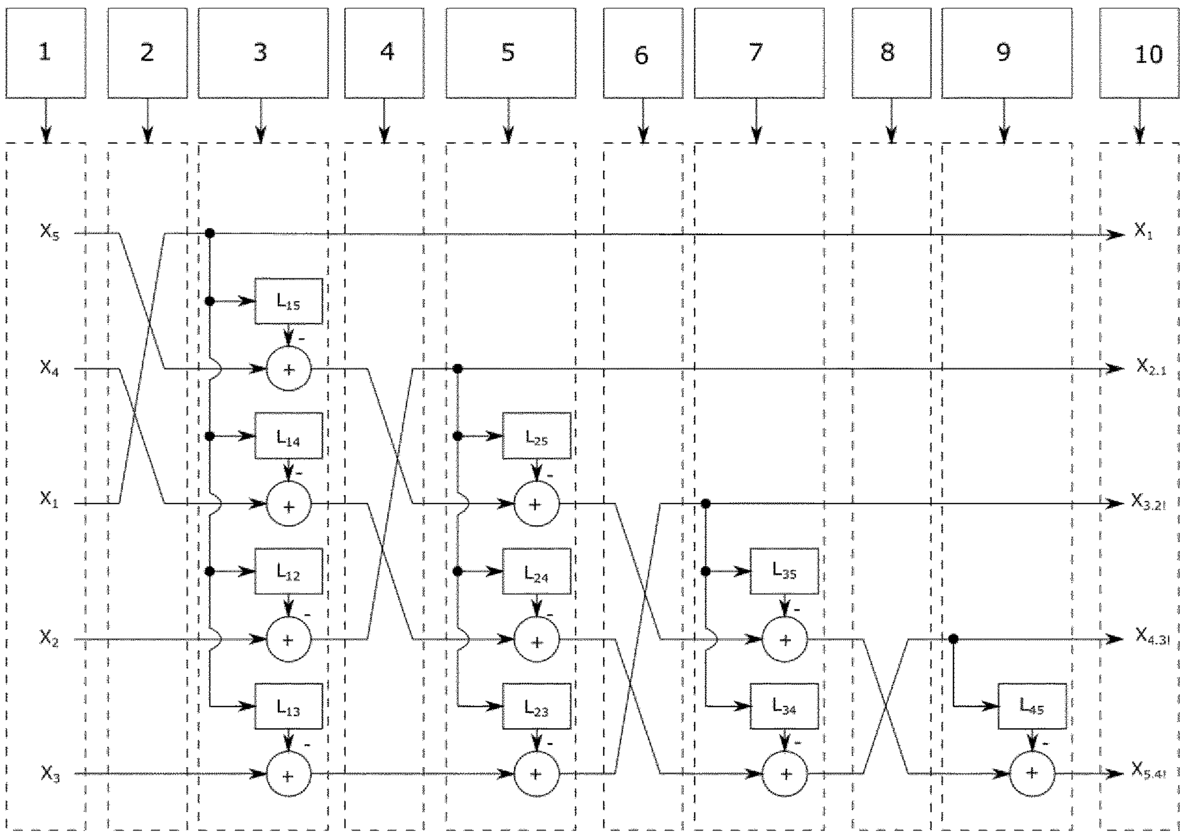
FIG. 7 illustrates a procedure for sorting a plurality of inputs.

In connection with FIGS. 6*a*, 6*b* and 7, the procedures of the method for determining the subset of subband reference signals, and consequently subset of the corresponding (fullband) reference signals, and the subset of the corresponding reference sensors for generating the reference signals are described in detail.

A MISO system may be used as a simplified model to describe a system comprising a plurality of inputs and a single output.

The MISO system may be represented by $$Y=\Sigma_{i=1}^{L_x} H_{iy} X_i + N.$$

Wherein $X_i$, i=1, 2, . . . , i, . . . , $L_x$, represents the plurality of inputs, and Y represents the single output. And $H_{iy}$ is a transfer function for representing a linear relationship between each input $X_i$ and output Y. N represents all possible deviations from an ideal model. That is, N represents everything that is not measured and accounted by the inputs.

FIG. 6*a* is an example of a MISO system. With the transfer function $H_{iy}$, a contribution $Y_i$, i=1, 2, . . . , i, . . . , $L_x$ of each input $X_i$ to the output Y can be calculated. The output Y is a sum of each contribution $Y_i$ and N.

In order to better characterise the MISO system, much studies have been done to identify the transfer function $H_{iy}$.

The MISO system of FIG. 6*a* can be equivalently represented by an ordered set of conditioned inputs, wherein each input has been conditioned by the previous inputs, as shown in FIG. 6*b*.

In FIG. 6*b*, $X_{i.(i-1)!}$ means a conditioned input $X_i$. That is, for each conditioned input $X_i$, linear effects of $X_1$ to $X_{i-1}$ have been removed, e.g., by optimum linear least-squares prediction techniques. The conditioned inputs $X_{i.(i-1)!}$ are uncorrelated to each other. The transfer functions $L_{iy}$ of FIG. 6*b* are in general different from the $H_{iy}$ in FIG. 6*a*.

The equivalent MISO system in FIG. 6*b* may be represented by $$Y=\Sigma_{i=1}^{L_x} L_{iy} X_{i.(i-1)!} + N$$

Thus, it is possible to determine $H_{iy}$ and $L_{iy}$ by the following relationships $$H_{iy} = \frac{S_{iy\cdot 1,2,\ldots,(i-1),(i+1),\ldots,L_x}}{S_{ii\cdot 1,2,\ldots,(i-1),(i+1),\ldots,L_x}}$$

where $S_{ij}$ is a cross-spectral density between a signal i and a signal j, and $S_{ii}$ is an autospectrum of the signal i.

$$\begin{bmatrix} 1 & L_{12} & \ldots & L_{1L_x} \\ 0 & 1 & \ddots & \vdots \\ \vdots & \ddots & \ddots & L_{(L_x-1)L_x} \\ 0 & \ldots & 0 & 1 \end{bmatrix} \begin{bmatrix} H_{1y} \\ H_{2y} \\ \vdots \\ H_{L_x y} \end{bmatrix} = \begin{bmatrix} L_{1y} \\ L_{2y} \\ \vdots \\ L_{L_x y} \end{bmatrix}$$

Thus, it is possible to decompose the MISO system into uncorrelated subsystems each comprising a single input and allows in particular the computation of multiple coherence $\gamma^2$ quantifying a degree of linearity between each of the plurality of inputs $X_i$ and the output Y. Thus, it is possible to determine which one(s) of the plurality of input $X_i$ contribute most to the output, i.e. which one(s) of the plurality of input $X_i$ is/are the most significant input(s).

Determining the multiple coherence $\gamma^2$ may be useful in the ANC and/or ARNC systems. For example, a sound reduction that can be achieved by the ANC and/or ARNC system using $L_x$ reference signals may be limited by the multiple coherence $\gamma^2$ quantifying the degree of linearity between each of the reference signals and a sound measured at a position. The relationship between the sound reduction $\Delta dB_{limit}$ and the multiple coherence $\gamma^2$ can be expressed as $$\Delta dB_{limit}=10 \log(1-\gamma^2).$$

The multiple coherence $\gamma^2$ involving all inputs is independent on the order of the plurality of inputs $X_i$. However, partial coherences between each input and the output are dependent on the order of the plurality of inputs $X_i$.

The coherence level or partial coherence level is a mathematical way to represent a relationship between a plurality of signals or data sets. For example, it may be used to estimate a power transfer between an input and an output of a linear system. It may be used to estimate a contribution of an input to an output in the MISO system.

Thus, by selecting the input having a largest coherence value or a largest partial coherence value between each (conditioned) input and the single output, the inputs may be selected, and optionally sorted, by a decreased contribution to the output. The input which has a largest contribution to the output is the first one to be selected among the plurality of inputs. And the input which has a least contribution to the output is the last one to be selected among the plurality of inputs. Consequently, the plurality of inputs may also be sorted in an order according to their individual contributions to the output. That is, the subset of subband reference signals, and consequently the subset of the corresponding reference signals, and the subset of the corresponding reference sensors for generating the reference signals, which contribute most to a sound in a certain frequency range may be determined.

This may be advantageous as it may facilitate further processing based on the sorted plurality of inputs. For example, in order to save computation capacities, it is possible to only process the inputs having a coherence value larger than a threshold.

In connection with FIG. 7, the steps for selecting a subset of subband reference signals (i.e. a subset of reference signals, or a subset of reference sensors) are discussed in detail.

The MISO system of FIG. 7 has five inputs $X_1$ to $X_5$ and one single output (not shown). However, the number of the inputs can be any positive integer. The five inputs may be five different fullband reference signals generated by five different reference sensors. The single output may be an acoustic signal measured at e.g., a location within an acoustic cavity, such as a position being close to an ear and/or head position of a driver within a car. The frequency range in which multiple coherence should be maximized may be a frequency range corresponding to a subband of the examples of FIGS. 3-5.

In FIG. 7, the inputs $X_1$ to $X_5$ are numbered according to a final order of inputs sorted based on their respective coherence to the output, i.e. their respective contribution to the output, in the frequency range corresponding to the subband. That is, in FIG. 7, the input $X_1$ has a largest coherence to the output and the input $X_5$ has a least coherence to the output. This is only to simplify the illustration. However, the inputs may be arranged in any order.

Step 1. The inputs $X_1$ to $X_5$ may be arranged in an arbitrary order. In FIG. 7, the inputs are arranged in this order: $X_5$, $X_4$, $X_1$, $X_2$, $X_3$.

Step 2. A coherence value between each of the inputs $X_1$ to $X_5$ and the output is calculated. The input having a largest coherence value in the frequency range corresponding to the subband is selected as a first input. Here, $X_1$ is the first input, which has the largest coherence value. The remaining group of inputs consists inputs $X_1$ to $X_5$.

Step 3. A first stage of the MISO system identification is performed, which essentially consists of conditioning the remaining group of inputs by the input selected in the step immediately prior to the present step 3, i.e. $X_1$ selected in step 2. The conditioning step may remove linear contributions $L_{15}$, $L_{14}$, $L_{12}$, $L_{13}$ of the inputs $X_5$, $X_4$, $X_2$ and $X_3$ to the output, respectively, which has already been accounted for the selected input $X_1$.

The conditioned inputs $L_{15}$, $L_{14}$, $L_{12}$, $L_{13}$ in this example may be calculated as:

$$X_{j.1}=X_j-L_{1j}X_1,\ j=2,3,4,5$$

Step 4. A partial coherence $\gamma_{iy.1}^2$, i=2, . . . , 5, between each conditioned input and the output is calculated. The input corresponding to a conditioned input having a largest partial coherence value in the frequency range corresponding to the subband is selected as a second input. Here, $X_2$ is the second input, which has the largest partial coherence value among the inputs $X_2$ to $X_5$. Now the remaining group of inputs consists inputs $X_3$ to $X_5$.

Step 5. A second stage of the MISO system identification is performed, which essentially consists of conditioning the remaining group of inputs by the input selected in the step immediately prior to the present step 5, i.e. $X_2$ selected in step 4. The conditioning step may remove linear contributions $L_{25}$, $L_{24}$, $L_{23}$ of the inputs $X_5$, $X_4$ and $X_3$ to the output, respectively, which has already been accounted for the selected input $X_2$.

The conditioned inputs $X_{5.2!}$, $X_{4.2!}$, $X_{3.2!}$ in this example may be calculated as:

$$X_{j.2!}=X_{j.1}-L_{2j}X_{2.1},\ j=3,4,5$$

From and including the step 5, an iteration of the steps 3-4 can be performed, e.g., the steps 5-6 and the steps 7-8 are iterations of the steps 3-4. By iteration, the remaining group of inputs are conditioned by the previously selected input, then a partial coherence between each of the remaining group of inputs and the output is calculated, and one input having a largest partial coherence value in the frequency range corresponding to the subband among the remaining group of input is selected. The iteration may continue until the remaining group of inputs consists of a last one input, $X_5$.

However, the method does not need to be performed until all the inputs are selected, as in FIG. 7. For example, if only a subset of all the input(s) that contribute most to the output is to be identified, it is sufficient to perform the method until a sufficient number of the inputs are selected. That is, the iteration may continue until a predetermined number of inputs have been selected. For example, only top three inputs having largest coherences are to be selected.

Alternatively, it is possible to determine a threshold representing a minimal partial coherence value. The method can be performed until a largest partial coherence value of the remaining group of inputs is below the threshold.

Step 9. A last stage of the MISO system identification is performed, which essentially consists of conditioning the last one input $X_5$ by the input selected in the step immediately prior to the present step 9, i.e. $X_4$ selected in step 8. The conditioning step may remove a linear contribution $L_{45}$ of the last one input $X_5$ to the output, which has already been accounted for the selected input $X_4$.

The conditioned input $X_{5.4!}$ in this example may be computed as:

$$X_{5.4!}=X_{5.3!}-L_{45}X_{4.3!}$$

Step 10. The last one input $X_5$ is selected as the last input, i.e. the fifth input in FIG. 7. The plurality of inputs may be sorted based on a sequence that each of the plurality of inputs is selected. Further, the plurality of inputs has been conditioned by the previously selected inputs. The first selected input, here $X_1$, is not conditioned as no input has been previously selected.

The method may be performed with an arbitrary number of inputs. The inputs may have an arbitrary initial order. Once the method is performed until all the inputs are selected, as shown in FIG. 7, all the inputs may be sorted by a decreased coherence, i.e. a decreased contribution, to the output. Since all the inputs, except the first selected input, are conditioned by the previously selected inputs, redundancy of information between the inputs may be reduced. That is, each input selected in the system at steps 2, 4, 6 and 8 maximally contributes to the output in terms of an added (non-redundant) information.

Thus, the method may select, and optionally sort, the inputs, e.g., in steps 2, 4, 6, 8 and 10 of FIG. 7, before the remaining group of inputs being used in a next iteration.

The method for selecting at least one input from a plurality of inputs of a MISO system, may be implemented in many existing MISO system, or systems comprising a MISO subsystem, such as an ANC or ARNC system of FIGS. 1-5.

Thus, a subset of reference sensors corresponding to the selected inputs can be selected according to the procedure of FIG. 7.

The selected subset of reference sensors may be more important than other unselected reference sensors in noise reduction in a frequency range corresponding to the subband.

Further, with the system decomposition, it is straightforward to estimate a maximum performance that the ANC system can achieve in a frequency range corresponding to one subband based on only the selected subset of the reference sensors.

According to the noise controlling systems of FIGS. 4-5, the ANC system has $L_x$ reference sensors. For a subband k, corresponding to a specific frequency range, a selected number $L_x^{(k)}$ reference sensors may be selected by the method of FIG. 7, wherein $L_x^{(k)}$ is equal to or smaller than $L_x$. That is, $L_x^{(k)} \leq L_x$.

The subset of reference sensors may be defined by the function $\chi^{(k)}$. The function $\chi^{(k)}$ may be defined by performing the method of FIG. 7, wherein the reference signals corresponding to the reference sensors k may be considered as the plurality of inputs of the MISO system of FIG. 7. The frequency range in which the coherence should be maximized may correspond to the frequency range of a subband of interest in the examples of FIGS. 3-5.

The function $\chi^{(k)}$ can then be defined as a function that maps $\{1, 2, \ldots, L_x^{(k)}\}$ to the first $L_x^{(k)}$ ordered input indexes.

For example, the inputs, i.e. the reference signals, are ordered as $X_2$, $X_3$, $X_5$, $X_1$, $X_4$ after the method of FIG. 7 is performed. If it is desired to select a top three inputs which contribute most ($L_x=3$), the function $\chi^k$ would be defined as $\chi^k(1)=2$, $\chi^k(2)=3$, $\chi^k(3)=5$, corresponding to the ordered inputs.

The performance that the ANC system can achieve for the subband k can be directly evaluated. For simplicity, the following indexes are chosen to be as a final order of all the inputs after they are sorted, as the example in FIG. 7. For simplicity, it is considered that in the example of FIG. 5, there are $L_x$ subband reference signals per subband.

The subband reference signals, or the reference signals or the reference sensors may be considered as the inputs of the example in FIG. 7.

The output may be an acoustic signal measured at e.g., one location within an acoustic cavity. The frequency range in which multiple coherence should be maximized may be a frequency range corresponding to the subband of interest.

The first $L_x^{(k)}$ subband reference signals of the sorted inputs may be selected, which may contribute to the following part of the output auto spectrum $S_{yy}$ according to $$S_{yy,L_x^{(k)}inputs}=\Sigma_{i=1\ \ldots}\ |L_{iy}|^2 S_{ii.(i-1)!}.$$

The partial coherences can be determined based on the conditioned spectra according to $$\gamma^2_{iy\cdot(i\text{-}1)} = \frac{|s_{iy\cdot(i\text{-}1)!}|^2}{s_{ii\cdot(i\text{-}1)!}\,s_{yy\cdot(i\text{-}1)!}}.$$

The multiple coherence from the $L_x^{(k)}$ selected (subband) reference signals to the output can be determined based on the partial coherences according to $$\gamma_{y:L_x^{(k)}inputs}{}^2=1-\Pi_{i=1\ \ldots}\ (1-\gamma_{iy.(i-1)!}{}^2).$$

Thus, a maximal sound reduction that can be achieved by using the selected $L_x^{(k)}$ (subband) reference signals of the subband k can be determined according to $$\Delta dB_{max}=10\log(1-\gamma_{y:L_x^{(k)}inputs}{}^2).$$

$L_x^{(k)}$ may be determined as the number of (subband) reference signals needed to achieve a certain level of noise reduction for a subband.

The selection of (subband) reference signals may be performed for each subband in order to determine a subset of subband reference signals for each subband. Preferably, the selection may be performed for only the first K/2+1 subbands of all the subbands.

Further, based on the determined subset of subband reference signals, a subset of reference sensors corresponding to the determined subset of subband reference signals may be determined, based on a one-to-one relationship between the reference sensors and the (subband) reference signals of each subband.

Then the function $$\chi^{(k)},\ k=1,2,\ \ldots\ ,\ \frac{K}{2}+1,$$

may be defined. Here, out of the K subbands, only the first K/2+1 subbands are used.

Figure 8:
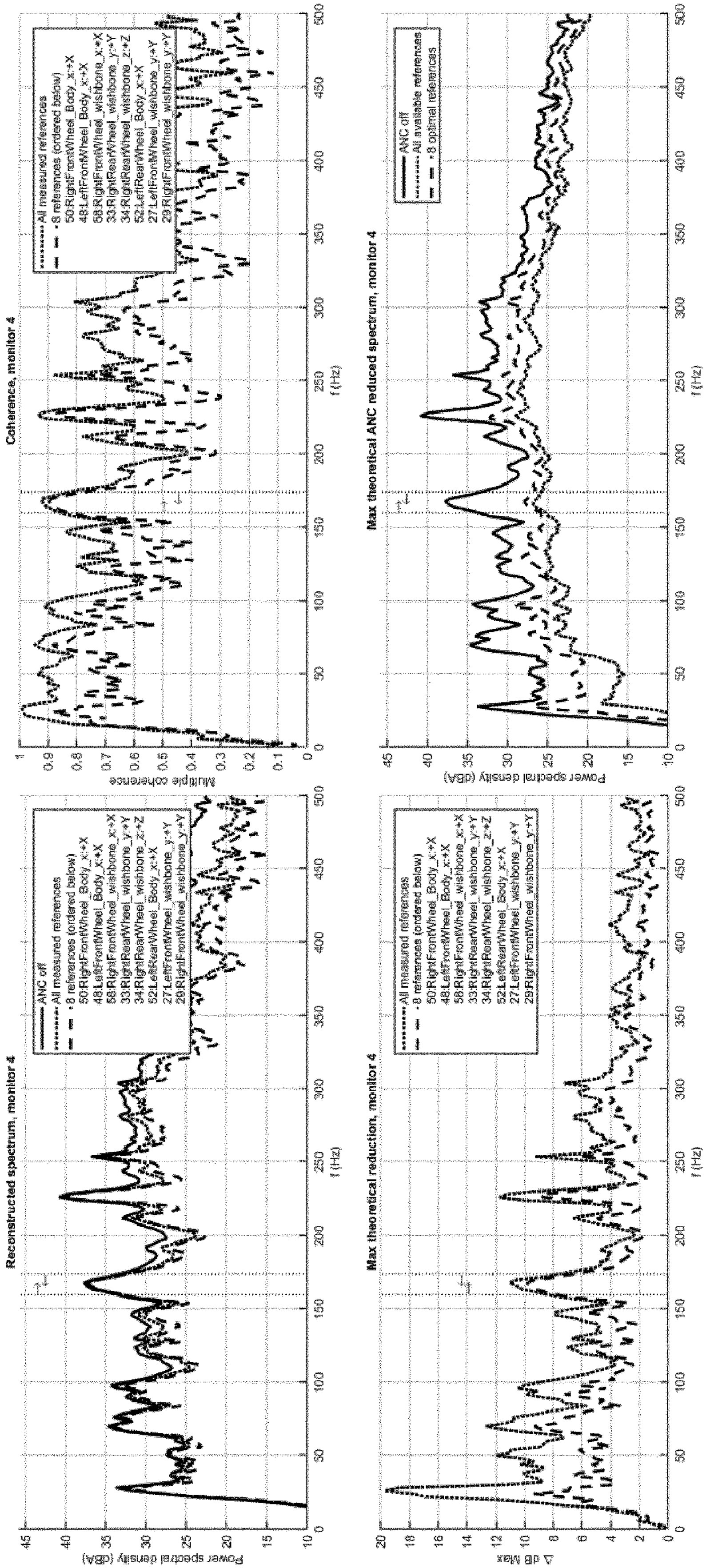
FIG. 8 illustrates four diagrams of noise reduction measurements.
Figure 9:
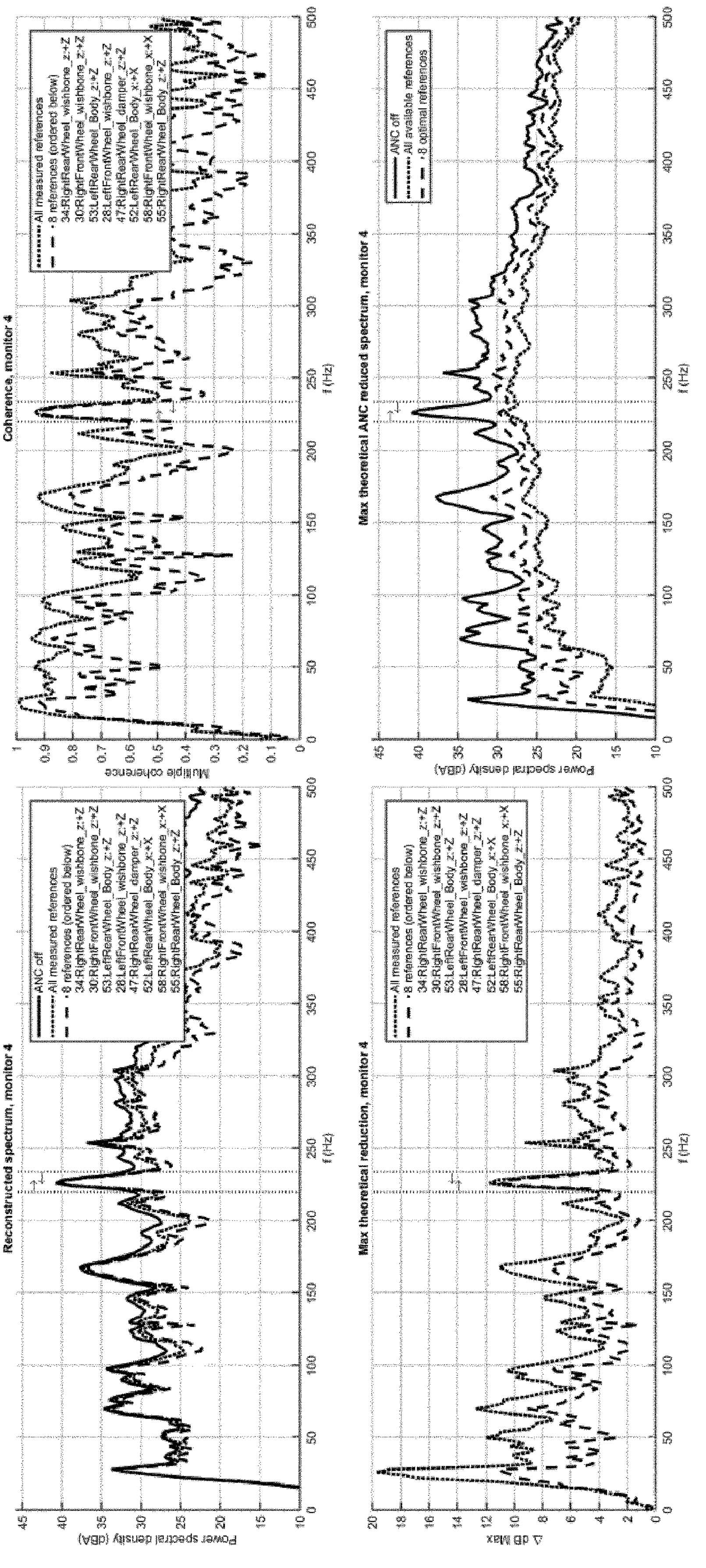
FIG. 9 illustrates four diagrams of noise reduction measurements.

FIGS. 8-9 respectively illustrates four diagrams of noise reduction measurements by selecting a subset of reference sensors in an ANC system for reducing noises within a car cockpit. There are 18 reference sensors used in the ANC system. That is, there are 18 fullband reference signals, being generated by the 18 reference sensors, respectively. Thus, taking the system of FIG. 5 as an example, for each subband corresponding to a specific frequency range, there are 18 subband reference signals, each corresponding to one of the 18 fullband reference signals and/or the 18 reference sensors.

The car was moving at a speed of 40 km/h when the measurements were performed. A sound was detected at a monitor microphone 4 being closed to a driver's left ear.

In the diagrams of FIGS. 8-9, the subband reference signals are listed by a decreased contribution to the sound detected at the monitor 4. That is, the first reference signal "50:RightFrontWheel_Body_x:+X" in FIG. 8 and the first reference signal "34:RightRearWheel_wisebone_z:+Z" in FIG. 9 contribute most to the detected sound, respectively. The reference signals are named after the position and direction of the corresponding reference sensors generating the reference signals. The reference sensors were accelerometers placed around the different wheels on the body of the car, the wishbones, or the dampers, in a forward (+X), a lateral (+Y) or an upward (+Z) direction. Here, the forward direction is the forward moving direction of the car.

In FIG. 8, the analysis is performed on a first subband corresponding to a frequency range of 160-174 Hz. In FIG. 9, the analysis is performed on a second subband corresponding to a frequency range of 220-234 Hz.

The acoustic spectra of FIGS. 8-9 are reconstructed by selecting various numbers of subband reference signals, optimized over the respective frequency ranges, for the sound detected at monitor 4.

From FIGS. 8-9, it is clear that the top four subband reference signals which contribute the most to the sound detected at the monitor position 4, in the first subband, i.e. 160-174 Hz, are different from those in the second subband, i.e. 220-234 Hz. In the first subband, the four most significant subband reference signals consist of reference signals generated by the reference sensors oriented in the forward (+X) and lateral (+Y) directions. While in the second subband, the four most significant subband reference signals consist of reference signals generated by the reference sensors oriented in an upwards direction (+Z).

The differences do reflect an excitation of different dominating modes. For example, the dominating modes in the frequency range of 160-174 Hz are front-back and lateral modes, and the dominating modes in the frequency range of 220-234 Hz are vertical modes.

Thus, for the first and second subbands corresponding to these two frequency ranges, in order to optimise the system for reducing noises at the monitor 4, it is possible to use a subset, e.g., the top four or top eight subband reference signals, of the total 18 subband reference signals, indicated in FIGS. 8-9.

There is normally more than one monitor within the acoustic cavity, e.g., the car cockpit. The method may be performed for different monitors provided at different positions.

The method may be performed to span a larger frequency range, i.e. for a plurality of subbands of interest to select a subset of the reference signals for each of these subbands.

The reference signals and/or the subband reference signals may be ordered according to a value, e.g., an average sound level representing the sounds detected at more than one monitor positions.

FIGS. 10-11 illustrate diagrams of measured SPL values.

A sound pressure or acoustic pressure is a local pressure deviation from the ambient, average or equilibrium, atmospheric pressure, caused by a sound wave. In the air, the sound pressure can be measured using e.g., a microphone. The sound pressure level, SPL, or the acoustic pressure level, is a logarithmic measure of the effective pressure of a sound relative to a reference value.

FIGS. 10-11 illustrate different SPL values without and with an active noise control with a FXLMS algorithm for a road noise within a car. The algorithm is configured to control only the noise for the subbands around a resonance frequency at 160 Hz, and a resonance frequency at 230 Hz, respectively.

The car is provided with 8 reference sensors placed around the different wheels on the body of the car, the wishbones, or the dampers, wherein 4 in a forward (X) and lateral (Y) directions, and 4 in an upward direction (Z). Here, the forward direction is the forward moving direction of the car.

Among the 4 reference sensors in the forward (X) and lateral (Y) directions, 2 reference sensors are in the forward (X) direction and 2 reference sensors are in the lateral (Y) direction.

The car is also provided with 4 sound sources for generating secondary noises, e.g., loudspeakers, and 6 error sensors, e.g., control microphones.

The results shown in FIGS. 10-11 are for the error sensor number 3, being placed on a roof over a driver's head.

Figure 10A:
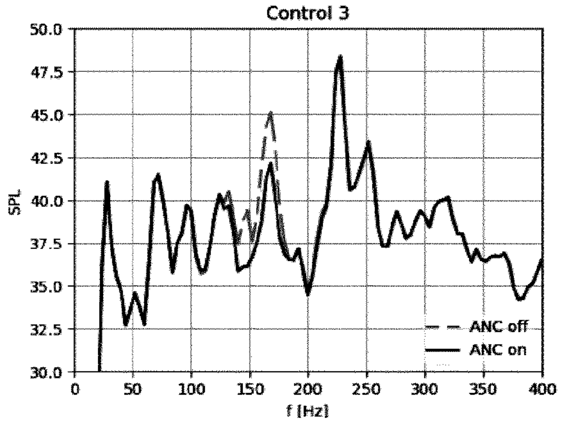
FIGS. 10*a*-10*c* illustrate diagrams of measured SPL values.
Figure 10B:
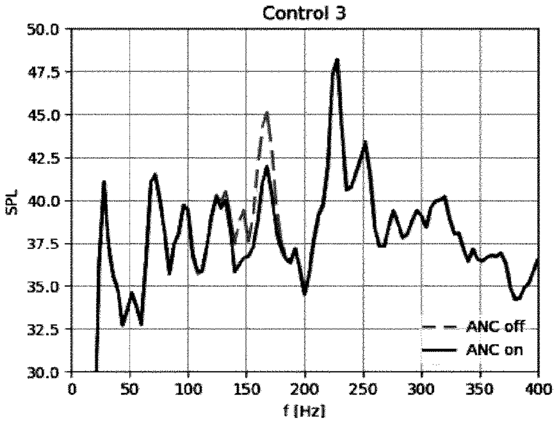
Figure 10C:
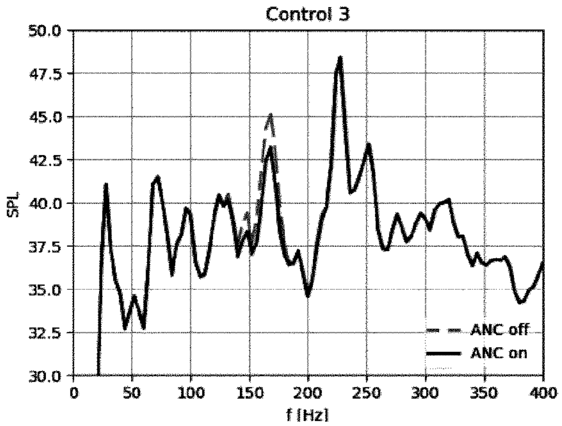

The diagrams of FIGS. 10*a*-10*c* illustrate SPL values of without and with the active noise control by using all 8 reference sensors, by using only the 4 reference sensors in the forward and lateral directions, and by using only the 4 reference sensors in the upward direction, respectively.

Figure 11A:
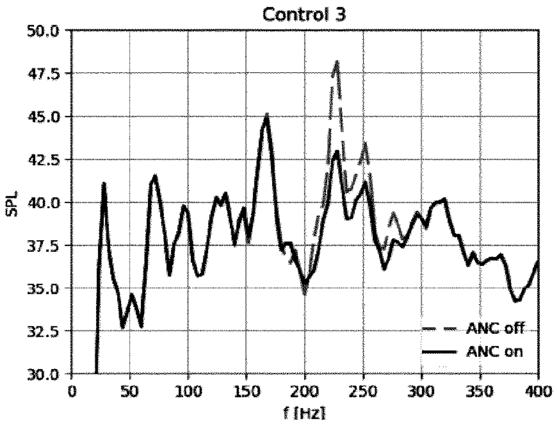
FIGS. 11*a*-11*c* illustrate diagrams of measured SPL values.
Figure 11B:
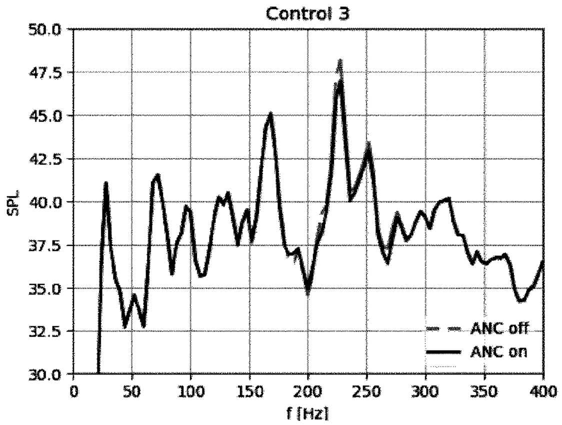
Figure 11C:
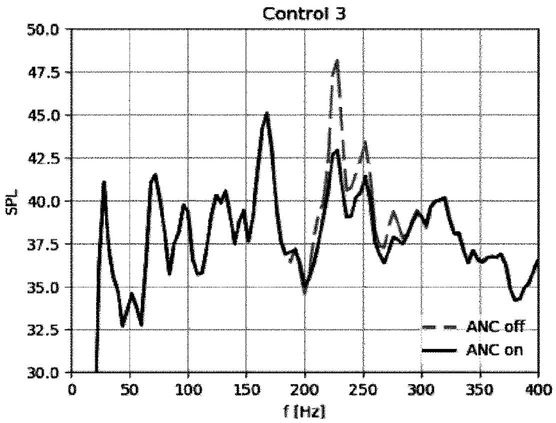

The diagrams of FIGS. 11*a*-11*c* illustrate SPL values of without and with the active noise control by using all 8 reference sensors, by using only the 4 reference sensors in the forward and lateral directions, and by using only the 4 reference sensors in the upward direction, respectively.

In FIGS. 10*a*-10*c*, the algorithm is configured to control only the subbands corresponding to a frequency around the resonance at 160 Hz, while in FIGS. 11*a*-11*c* the algorithm is configured to control only the subbands corresponding to a frequency around the resonance at 230 Hz.

From FIG. 8, it is known that at around 160 Hz, the resonance can be best represented by the reference signals in the forward and lateral directions. In connection with the measured SPL values in FIGS. 10*a* and 10*b*, it is clear that using only these 4 reference sensors in the forward and lateral directions, the noise cancellation resulted is almost as good as using all 8 reference sensors.

Similarly, from FIG. 9, it is known that at around 230 Hz, the resonance can be best represented by the reference signals in the upward direction. In connection with the measured SPL values in FIGS. 11*a* and 11*c*, it is clear that using only these 4 reference sensors in the upward direction, the noise cancellation resulted is almost equal to a maximal noise reduction by using all 8 reference sensors.

Thus, at least for these subbands, there is no need to involve all the subband reference signals to achieve a good noise reduction. Rather, by selecting a subset of subband reference signals, a good noise reduction may be achieved. Meanwhile, the computational cost involved may be reduced and the convergence speed may be improved.

The function $\epsilon^{(k)}$ and/or $\psi^{(k)}$ for selecting a subset, preferably a proper subset, of error sensors, and a subset, preferably a proper subset, of sound sources for a subband k, respectively, may be determined by different methods.

For example, the function $\epsilon^{(k)}$ and/or $\psi^{(k)}$ for the subband k may be determined by an optimal spatial matching of a primary sound field by a secondary sound field, for a specific frequency range of the subband k.

The sound fields within an acoustic cavity, e.g., a car cockpit, may be mainly governed by resonant acoustic modes, which are dependent on the frequency of the acoustic waves. Thus, for different subbands corresponding to different frequency ranges, the sound fields may be governed by different acoustic modes.

The positions of the error sensors and/or sound sources may be selected to match the acoustic modes over a whole frequency range of the noise to be cancelled and different operating conditions, such as a moving speed of a car.

Matching the acoustic modes may comprise placing the error sensors and/or sound sources somewhere outside of modal nodes.

The modal nodes or modal lines comprise points in space where the acoustic modes, caused by standing waves, have a zero amplitude. That is, there is no signal at all at the modal nodes or modal lines. Consequently, in order to cancel the primary sound, the error sensors and/or sound sources should be preferably placed outside of these regions in space.

The position of at least one error sensor and/or at least one sound source may be selected to match the acoustic modes for a specific frequency range corresponding to at least one subband k.

However, for the subband k, it is common that not all provided error sensors and/or sound sources may be needed, as the acoustic modes of the frequency range of the subband k may be different from the acoustic modes over the whole frequency range of the noise to be cancelled, especially at lower frequencies, where the acoustic modes are less complex, e.g., 20 to 100 Hz.

Thus, for the subband k, it is possible to use only the subband reference signals decomposed from the reference signals generated by those reference sensors which are needed for the subband k. That is, the subband reference signals decomposed from the reference signals generated by those reference sensors which are not needed, can be discarded, when processing with the subband reference signals, e.g. when updating the subband adaptive filters.

It may be advantageous to discard those subband reference signals when they are not needed, to further reduce a size of the system for each subband. Analogously, for the subband k, it is possible to discard some subband error signals. Analogously, it is also possible not to update at least some of the subband adaptive filters corresponding to the sound sources that are not needed.

With a reduced number of subband signals, the amount of computational operations may be reduced, and the convergence speed of the method may be improved.

Figure 12:
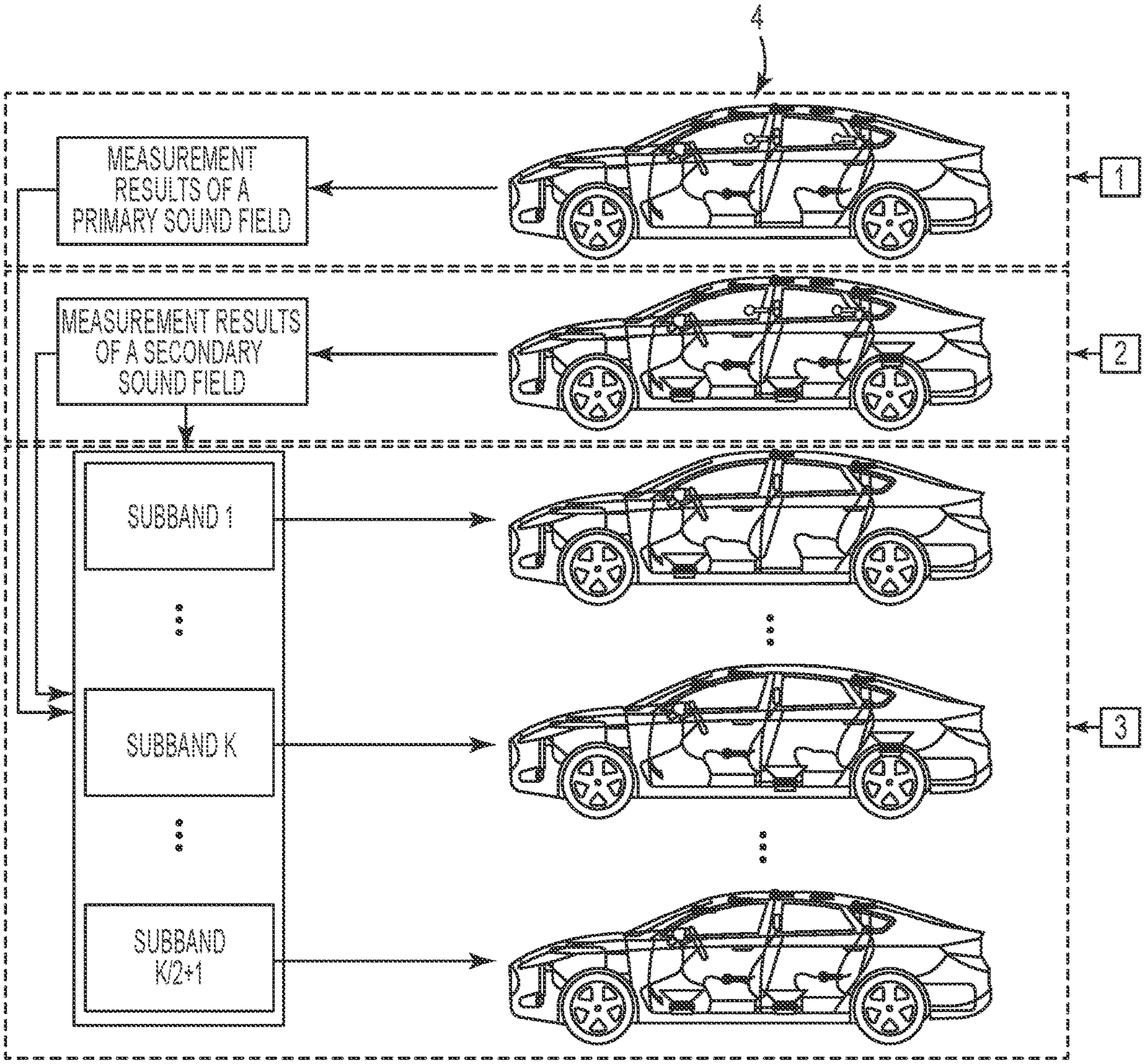
FIG. 12 illustrates an example of a method for defining the function $\epsilon^{(k)}$ and/or $\psi^{(k)}$.

The procedure to define the function $\epsilon^{(k)}$ and/or $\psi^{(k)}$ for the subband k is illustrated in FIG. 12. The acoustic cavity is a car cockpit in this example.

In step 1, operational measurements of a primary sound field, i.e. a disturbance sound field to be cancelled, generated for example by a road-tyres interaction, of a noise within the cockpit, are performed. For example, the operational measurements may be performed during an accelerating from e.g., 0 to 130 km/h. The car is provided with a plurality of error sensors, represented by the black coloured microphones in FIG. 12, and a plurality of monitor sensors, represented by while coloured microphones in FIG. 12. The monitor sensors may be provided at positions that a sound level is to be detected and eventually to be reduced, e.g., positions being closed to a head or an ear of a driver and/or a passenger. Based on the operational measurements, the auto-spectra and cross-spectra of all the provided sensors may be determined.

In step 2, a secondary sound field, i.e. a sound field generated by the secondary sound sources, may be characterized through a measurement of response functions from all sound source positions to all sensor positions, including both the error sensors and the monitor sensors.

In step 3, measured data from steps 1 and 2 is analysed to define a group of optimal positions of the error sensors and/or sound sources, for each subband k, to provide sufficient sound reductions at the monitor sensor positions for the whole frequency range of the noise.

The analysis of step 3 may be performed in a frequency domain for each subband k. The defined group of optimal positions of the error sensors and/or sound sources may be used to define the function(s) $\epsilon^{(k)}$ and/or $\psi^{(k)}$ for determining that the error sensors and/or sound sources at the optimal positions are the ones to be used for each subband k. Consequently, the subband filtered reference signals and/or subband error signals corresponding to these sound sources and/or error sensors may be selected for updating the subband adaptive filters corresponding to the selected sound sources. Subband signals corresponding to other non-selected error sensors and/or sound sources for the subband k may be discarded.

Figure 13:
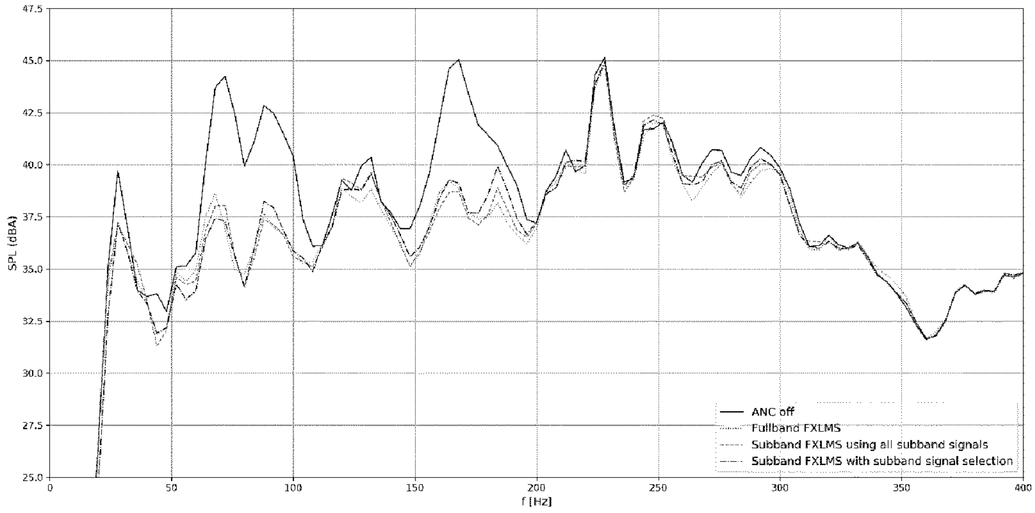
FIG. 13 illustrates a diagram of measured SPL values.

FIG. 13 illustrates a diagram of measured SPL values when different ANC methods is performed or none ANC method is performed, i.e. ANC off.

The SPL values in FIG. 13 are measured at a position close to a front passenger's ear within a small electric car, which is provided with 8 reference sensors placed close to the wheels, 4 loudspeakers and 6 microphones. The car was moving forward at a speed of 40 km/h when measurements were performed.

The SPL values, without any active noise control, with an active noise control method using a fullband FXLMS algorithm, with an active noise control method using a subband FXLMS algorithm with all subband reference signals used, and with an active noise control method using a subband FXLMS algorithm with a selected subset of subband reference signals for selected subbands, are presented in FIG. 13. Here, the selected subset of subband reference signals is about a half of all the subband reference signals for the selected subbands.

From FIG. 13, it is clear that a similar level of noise reduction can be achieved by the active noise control method using a subband FXLMS algorithm using the selected subset of subband reference signals for selected subbands, comparing with other two active noise control methods. However, using a smaller and optimized subset of subband reference signals may result in a much lower computational cost.

In this example, only the subset of the reference sensors are selected. That is, all the subband error signals are used and all the subband adaptive filters are updated for all sound sources. However, a subset of error sensors and a subset of sound sources for the subband k may be selected to further reduce the computational cost, according to the method described in FIG. 12.

The step size of each individual subband may be adjusted based on the subband reference signals to reduce the spectral range or eigenvalue spread of the filtered reference matrix in each subband, to improve the convergence of the subband FXLMS algorithm. However, the step size is not adjusted in this example, explaining the similar performances between the fullband FXLMS and the subband FXLMS.

Figure 14:
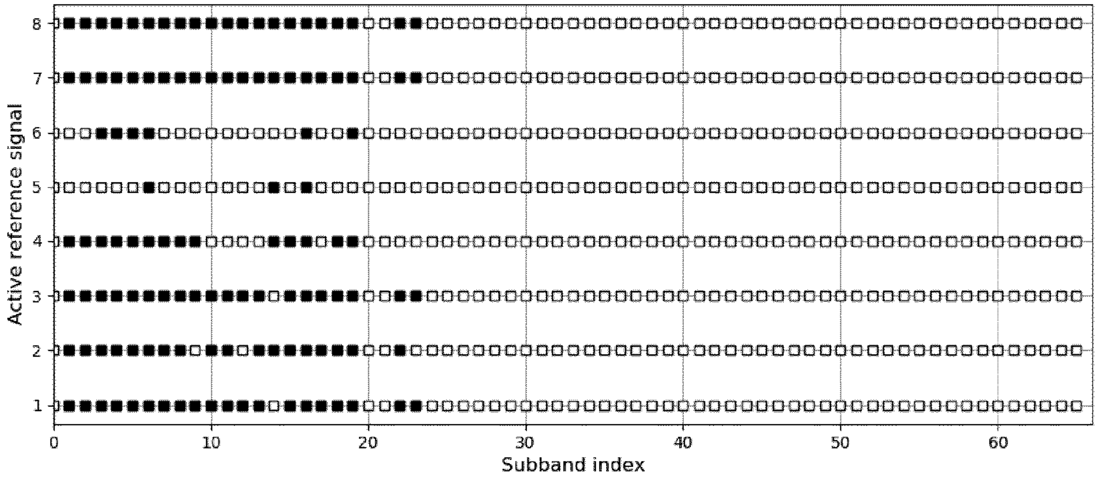
FIG. 14 illustrates an example of the function $\chi^{(k)}$.

FIG. 14 visualises an example the function $\chi^{(k)}$ for selecting the subset of the reference sensors to be active on each subband for the example shown in FIG. 13.

The y-axis of FIG. 14 is a reference sensor index. That is, each one of the numbers 1 to 8 refers to one of the eight reference sensors of FIG. 13. The x-axis of FIG. 14 is a subband index. An algorithm with 128 subbands was used in this example, where all information may be considered to be contained within the first 65 subbands.

The function $\chi^{(k)}$ for selecting a subset of the reference sensors according to FIG. 13 is defined as FIG. 14.

For example, in subband 1, the subband reference signals derived from the reference sensors 1, 2, 3, 4, 7 and 8 are selected, while the subband reference signals derived from the reference sensors 5 and 6 are not selected.

For example, in subbands 20 and 21, none of the reference sensors is selected. So do the subbands 24 to 65. The subband adaptive filters on these subbands having no subband reference signals due to no reference sensors being selected may not be updated.

The computational costs for different ANC methods are listed and compared in below Form. 1.

The example ANC system used has M sound sources, $L_x$ reference sensors, $L_e$ error sensors, K subbands, I taps for fullband adaptive filters, and J taps for secondary path models. The decimation rate D is taken as K/4. The number of taps for subband adaptive filters and the secondary path models are taken respectively as ISAF=4I/K and JSAF=4J/K. The numbers of multiplications per sample required in each step of the proposed method and other known ANC methods are listed in Form. 1.

It is assumed that in the proposed method, the signals corresponding to about 50% of the reference sensors, error sensors and sound sources are selected for each subband, and about only 50% of all the subbands are updated.

Form 1 Computational cost

| | The ANC method with a fullband FXLMS | The ANC method with a subband FXLMS with fullband secondary path modelling | The ANC method with a subband FXLMS with subband secondary path modelling | Proposed ANC method with a subband FXLMS with subband signal selector (FIG. 4) |
|---|---|---|---|---|
| Reference signals filtering | MLxLeJ | Same | $\frac{3ML_eL_xJSAF\left(\frac{K}{2}+1\right)}{D}$ | $\frac{3\frac{M}{2}\frac{L_e}{2}\frac{L_x}{2}JSAF\left(\frac{K}{4}+1\right)}{D}$ |
| Subband analysis | — | $(L_e + ML_eL_x)4\log2(K)$ | $(L_e + L_x)4\log2(K)$ | $(L_e + L_x)4\log2(K)$ |

-continued

Form 1 Computational cost

| | The ANC method with a fullband FXLMS | The ANC method with a subband FXLMS with fullband secondary path modelling | The ANC method with a subband FXLMS with subband secondary path modelling | Proposed ANC method with a subband FXLMS with subband signal selector (FIG. 4) |
|---|---|---|---|---|
| Adaptive filter update | $ML_xI(1 + L_e)$ | $(3L_eML_xISAF + 2ML_xISAF) + \frac{\left(\frac{K}{2}+1\right)}{D}$ | $(3L_eML_xISAF + 2ML_xISAF) + \frac{\left(\frac{K}{2}+1\right)}{D}$ | $\left(3\frac{Le}{2}\frac{M}{2}\frac{Lx}{2}ISAF + 2\frac{M}{2}\frac{Lx}{2}ISAF\right)\frac{\left(\frac{K}{4}+1\right)}{D}$ |
| Weight stacking (subband synthesis) | — | $\frac{ML_x}{D}\left(4ISAF\left(\frac{K}{2}+1\right)\log2(2ISAF) + 2I\log2(2I)\right)$ | $\frac{ML_x}{D}\left(4ISAF\left(\frac{K}{2}+1\right)\log2(2ISAF) + 2I\log2(2I)\right)$ | $\frac{M/2\,L_x/2}{D}\left(4ISAF\left(\frac{K}{2}+1\right)\log2(2ISAF) + 2I\log2(2I)\right)$ |
| Fullband control signal generation | $ML_xI$ | $ML_xI$ | $ML_xI$ | $ML_xI$ |
| Total computational cost for M = 4, $L_x$ = 8, $L_e$ = 6, J = 256, I = 256, K = 128 | 114688 | 86216 | 41272 | 12112 |

The fullband secondary path modelling means that the reference signals x(n) may be first filtered by the secondary path model $\hat{S}$ 11. The filtered reference signals x'(n) may then be filtered by the filter bank 10 consisting of K subbands. Then, for each subband k, the subset of the subband reference signals of the subband k may be selected.

The subband secondary path modelling means that the reference signals x(n) are not filtered by the secondary path model $\hat{S}$ 11 before filtering by the filter bank 10. Rather, the reference signals x(n) are filtered and decimated by the filter bank 10 first. For each subband k, a subset of the subband reference signals may be selected. The selected subset of the subband reference signals may be filtered by the subband secondary path model $\hat{S}^{(k)}$ before updating the subband adaptive filters $W^{(k)}$, as in FIG. 5.

Figure 15:
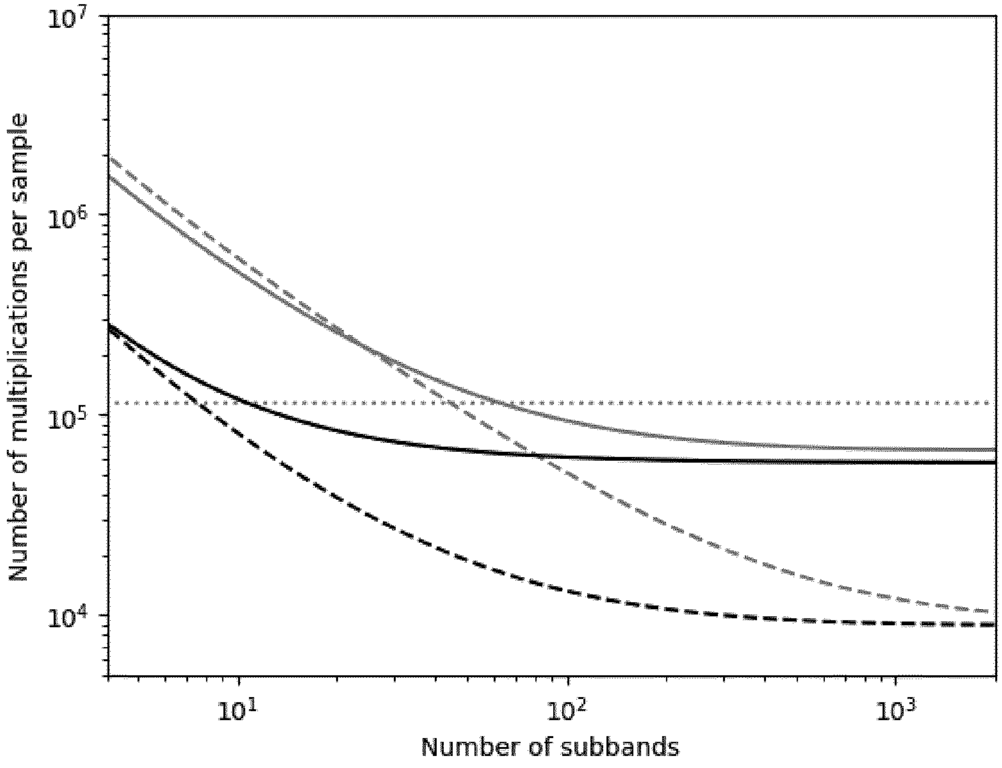
FIG. 15 illustrates a diagram of numbers of multiplications per sample of different ANC methods.

FIG. 15 is a diagram of numbers of multiplications per sample needed for the different methods of Form. 1, wherein M=4, $L_x$=8, $L_e$=6, J=256 and I=256.

The dotted line represents the number of multiplications per sample of the ANC method with standard fullband FXLMS.

The upper solid line represents the number of multiplications per sample of the ANC method with subband FXLMS using fullband secondary path modelling.

The upper dashed line represents the number of multiplications per sample of the ANC method with subband FXLMS using subband secondary path modelling.

The lower solid line represents the number of multiplications per sample of the proposed ANC method with subband FXLMS using fullband secondary path modelling and subband signal selection, as in FIG. 4.

The lower dashed line represents the number of multiplications per sample of the proposed ANC method with subband FXLMS using subband secondary path modelling and subband signal selection, as in FIG. 5.

When there are 128 subbands, the proposed ANC method with subband FXLMS using subband secondary path modelling and subband signal selection represents a reduction in computational cost of a factor of 3.4 compared to the same algorithm without subband signal selection, and a factor 9.5 compared to the ANC method with standard fullband FXLMS algorithm.

For the example shown in FIG. 13, the computational cost may be reduced by a factor of 6 compared to the ANC method with fullband algorithm and a factor of 2.5 compared to ANC method with the standard subband algorithm.

Additional computational cost reduction may be achieved if a subset of the error sensors and/or a subset of the sound sources to be active on each subband, respectively, are selected for updating the subband adaptive filters, e.g., by the function $\epsilon^{(k)}$ and/or $\psi^{(k)}$.

It is known that the convergence speed of the fullband delay-less subband algorithm is determined by the convergence speed of the updating algorithm in each subband. The convergence speed of each subband adaptive filter is governed by the Hessian matrix $E[\hat{R}^{(k)H}R^{(k)}]$, more precisely by its eigenvalue spread, defined as the ratio of the largest to the smallest eigenvalues.

Thus, by selecting the subsets of the subband signals, including any of the subband reference signals and the subband error signals, for constructing $R^{(k)}$ in each subband k, instead of using all available subband signals, the size of the Hessian matrix may be reduced significantly.

Consequently, the eigenvalue spread may be reduced. A faster convergence speed can be achieved by determining an optimal step size for each subband. A low converged level may be ensured through an optimal numbers and/or positions of the reference sensors, the sound sources and the error sensors, as well as an optimal definition of the functions $\chi^{(k)}$, $\epsilon^{(k)}$ and/or $\psi^{(k)}$, for each subband.

The invention claimed is:

1. A noise controlling method, comprising:

generating one reference signal representing a primary noise;

generating one secondary noise in response to a control signal, for cancelling the primary noise; and generating one error signal representing a superposition of the primary noise and the one secondary noise at a position;

wherein the method further comprises:

generating at least one additional reference signal, and/or at least one additional secondary noise, wherein each additional secondary noise is generated in response to a respective control signal, and/or at least one additional error signal; and generating the control signal(s) for generating the secondary noise(s), by executing an adaptive subband filtering algorithm based on the reference signal(s) and the error signal(s);

wherein the step of generating the control signal(s) comprises:

decomposing the reference signal(s) and the error signal(s) into subband reference signal(s) and subband error signal(s), respectively, for each subband of a plurality of subbands;

providing subband adaptive filters for each subband for processing the subband reference signal(s) and the subband error signal(s);

updating only a subset of the subband adaptive filters for at least one subband of the plurality of subbands, based on only a subset of the subband reference signal(s) of the at least one subband and only a subset of the subband error signal(s) of the at least one subband, wherein at least one of the three said subsets is a proper subset;

updating at least one fullband adaptive filter based on the updated subband adaptive filter(s); and generating the control signal(s) by filtering the reference signal(s) by the updated at least one fullband adaptive filter.

2. The method as claimed in claim 1, wherein the plurality of subbands consist of a number K of subbands, K being an even positive integer, the method further comprising performing the step of updating the subset of the subband adaptive filters for a number t of subbands of the plurality of subbands, wherein a relationship between the numbers K and t is: $t=K/2+1$.

3. The method as claimed in claim 1, wherein the adaptive subband filtering algorithm comprises a filter bank comprising a plurality of subbands, for decomposing the reference signal(s) and the error signal(s).

4. The method as claimed in claim 1, further comprising:

prior to the step of decomposing the reference signal(s) and the error signal(s), filtering the reference signal(s) with a secondary path model $\hat{S}$.

5. The method as claimed in claim 1, further comprising:

after the step of decomposing the reference signal(s) and the error signal(s), for each subband of the plurality of subbands, filtering the subband reference signal(s) with a subband secondary path model.

6. The method as claimed in claim 1, wherein the adaptive subband filtering algorithm is a filtered-x least mean square, FXLMS, algorithm.

7. The method as claimed in claim 6, wherein the FXLMS algorithm is delay-less.

8. The method as claimed in claim 1, wherein for the at least one subband of the plurality of subbands, the subset of subband adaptive filter(s) is/are updated by using a least mean square, LMS, algorithm.

9. The method as claimed in claim 1, wherein the fullband adaptive filter is updated based on the updated subband adaptive filter(s), by a weight stacking scheme or a frequency stacking scheme.

10. The method as claimed in claim 1, further comprising:

for the at least one subband of the plurality of subbands, determining the subset of the subband reference signal(s) and/or the subset of the subband error signal(s) by an optimization process.

11. The method as claimed in claim 1, further comprising:

determining a leakage factor of the adaptive subband filtering algorithm based on a statistical property of the reference signal(s) and/or of the error signal(s).

12. The method as claimed in claim 1, further comprising:

determining a step size of the adaptive subband filtering algorithm based on a statistical property of the reference signal(s) and/or of the error signal(s).

13. The method as claimed in claim 1, wherein when the method comprises generating at least one additional reference signal, the method further comprises for the at least one subband, selecting the subset of the subband reference signals, comprising steps in a following order:

1) calculating a coherence value representing a coherence level at a frequency range of the at least one subband, between each of the subband reference signals and an output signal, wherein the output signal is one of: the error signal(s) and a signal representing a sound measured at a second position;

2) among the subband reference signals, selecting a subband reference signal having a largest coherence value;

3) creating a remaining group of the subband reference signals, wherein the remaining group of the subband reference signals consists all the subband reference signals except the previously selected subband reference signal(s);

4) for each subband reference signal of the remaining group of subband reference signals, generating a conditioned subband reference signal, by conditioning the subband reference signal;

5) for each conditioned subband reference signal, calculating a partial coherence value representing a coherence level at the frequency range of the at least one subband, between the conditioned subband reference signal and the output signal; and 6) among the remaining group of reference signals, selecting a subband reference signal corresponding to a conditioned subband reference signal having a largest partial coherence value.

14. A noise controlling system, comprising:

one reference sensor configured to generate one reference signal representing a primary noise;

one sound source configured to generate one secondary noise in response to a control signal, for cancelling the primary noise; and one error sensor configured to generate one error signal representing a superposition of the primary noise and the one secondary noise at a position;

wherein the system further comprises:

an additional reference sensor configured to generate an additional reference signal;

and/or an additional sound source configured to generate an additional secondary noise in response to an additional control signal;

and/or an additional error sensor configured to generate an additional error signal; and a control circuit configured to generate the control signal(s) for generating the secondary noise(s), by executing an adaptive subband filtering algorithm based on the reference signal(s) and the error signal(s);

wherein the control circuit is further configured to:

decompose the reference signal(s) and the error signal(s) into subband reference signal(s) and subband error signal(s), respectively, for each subband of a plurality of subbands;

provide subband adaptive filters for each subband for processing the subband reference signal(s) and the subband error signal(s);

update only a subset of the subband adaptive filters for at least one subband of the plurality of subbands, based on only a subset of the subband reference signal(s) of the at least one subband and only a subset of the subband error signal(s) of the at least one subband, wherein at least one of the three said subsets is a proper subset;

update at least one fullband adaptive filter based on the updated subband adaptive filter(s); and generate the control signal(s) by filtering the reference signal(s) by the updated at least one fullband adaptive filter.

15. The system as claimed in claim 14, wherein the plurality of subbands consist of a number K of subbands, K being an even positive integer, and the control circuit is further configured to update the subset of the subband adaptive filters for a number t of subbands of the plurality of subbands, wherein a relationship between the numbers K and t is: $t=K/2+1$.

* * * * *